United States Patent
Chen et al.

(10) Patent No.: US 7,783,866 B2
(45) Date of Patent: *Aug. 24, 2010

(54) METHOD AND APPARATUS FOR EXECUTING INSTRUMENTATION CODE USING PROCESSOR INSTRUCTIONS

(75) Inventors: Wen-Tzer Thomas Chen, Austin, TX (US); Jimmie Earl DeWitt, Jr., Georgetown, TX (US); Frank Eliot Levine, Austin, TX (US); Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/381,807

(22) Filed: May 5, 2006

(65) Prior Publication Data

US 2007/0260860 A1 Nov. 8, 2007

(51) Int. Cl.
*G06F 7/38* (2006.01)
*G06F 9/00* (2006.01)
*G06F 9/44* (2006.01)

(52) U.S. Cl. .................. 712/229; 712/227
(58) Field of Classification Search .......... 712/227, 712/229
See application file for complete search history.

(56) References Cited

U.S. PATENT DOCUMENTS

| | | | |
|---|---|---|---|
| 5,133,057 A | 7/1992 | Ishii et al. | |
| 5,479,652 A * | 12/1995 | Dreyer et al. | 714/30 |
| 5,530,804 A | 6/1996 | Edgington et al. | |
| 5,737,611 A | 4/1998 | Vicik | |
| 5,872,909 A | 2/1999 | Wilner et al. | |
| 5,923,892 A | 7/1999 | Levy | |
| 6,023,759 A | 2/2000 | Omtzigt | |
| 6,216,237 B1 | 4/2001 | Klemm et al. | |
| 6,278,959 B1 | 8/2001 | Alferness | |
| 6,343,358 B1 * | 1/2002 | Jaggar et al. | 712/227 |
| 6,349,406 B1 | 2/2002 | Levine et al. | |
| 6,654,877 B1 | 11/2003 | Huck et al. | |
| 6,668,372 B1 | 12/2003 | Wu | |
| 6,732,311 B1 * | 5/2004 | Fischer et al. | 714/737 |
| 7,020,766 B1 * | 3/2006 | Wang et al. | 712/227 |
| 7,028,299 B1 | 4/2006 | Chang | |
| 7,293,260 B1 | 11/2007 | Dmitriev | |
| 2002/0103992 A1 | 8/2002 | Perry et al. | |
| 2003/0115584 A1 * | 6/2003 | Fahs et al. | 717/158 |
| 2003/0149716 A1 | 8/2003 | Peterson | |
| 2004/0054992 A1 * | 3/2004 | Nair et al. | 717/138 |

(Continued)

OTHER PUBLICATIONS

Oplinger et al., Enhancing Software Reliability with Speculative Threads, Dec. 2002, pp. 184-196.*

(Continued)

*Primary Examiner*—Eddie P Chan
*Assistant Examiner*—George D Giroux
(74) *Attorney, Agent, or Firm*—Yee & Associates, P.C.

(57) ABSTRACT

A computer implemented method, apparatus and computer program product for processing instructions. A determination is made as to whether an instruction is a start instrumentation instruction in response to identifying the instruction for execution while executing the instructions using a normal set of processor resources in a processor. Subsequent instructions are executed using an alternate set of processor resources until an end instrumentation instruction is encountered.

20 Claims, 14 Drawing Sheets

U.S. PATENT DOCUMENTS

| | | |
|---|---|---|
| 2004/0133764 A1 | 7/2004 | O'Connor et al. |
| 2005/0071821 A1 | 3/2005 | Levine et al. |
| 2005/0102583 A1* | 5/2005 | Spadari .................. 714/45 |
| 2005/0234657 A1* | 10/2005 | Johnson et al. ............ 702/35 |
| 2006/0230213 A1 | 10/2006 | Tousek et al. |
| 2007/0083731 A1 | 4/2007 | Kihara |

OTHER PUBLICATIONS

U.S. Appl. No. 11/381,798, filed May 5, 2006, Chen et al.

U.S. Appl. No. 11/381,790, filed May 5, 2006, Chen et al.

U.S. Appl. No. 11/381,812, filed May 5, 2006, Chen et al.

U.S. Appl. No. 11/381,803, filed May 5, 2006, Chen et al.

U.S. Appl. No. 11/381,795, filed May 5, 2006, Chen et al.

USPTO Office Action for U.S. Appl. No. 11/381,812 dated Dec. 14, 2009.

USPTO Office Action for U.S. Appl. No. 11/381,803 dated Dec. 9, 2009.

USPTO office action dated Aug. 7, 2009 for U.S. Appl. No. 11/381,795, pp. 1-27.

* cited by examiner

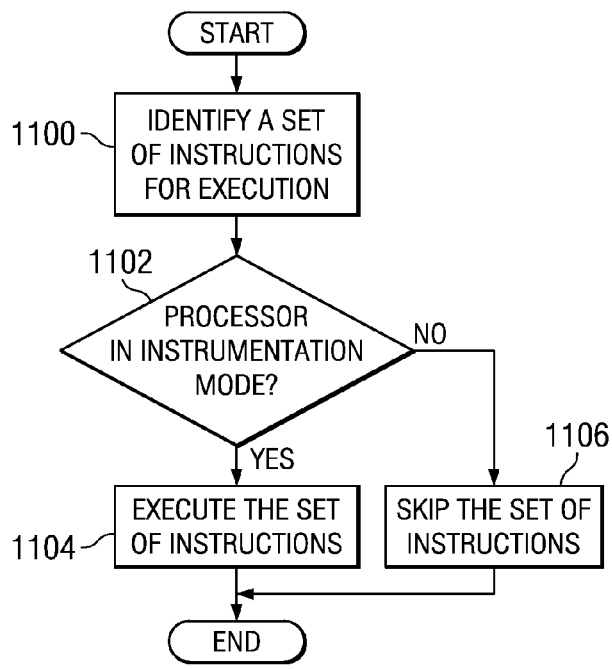
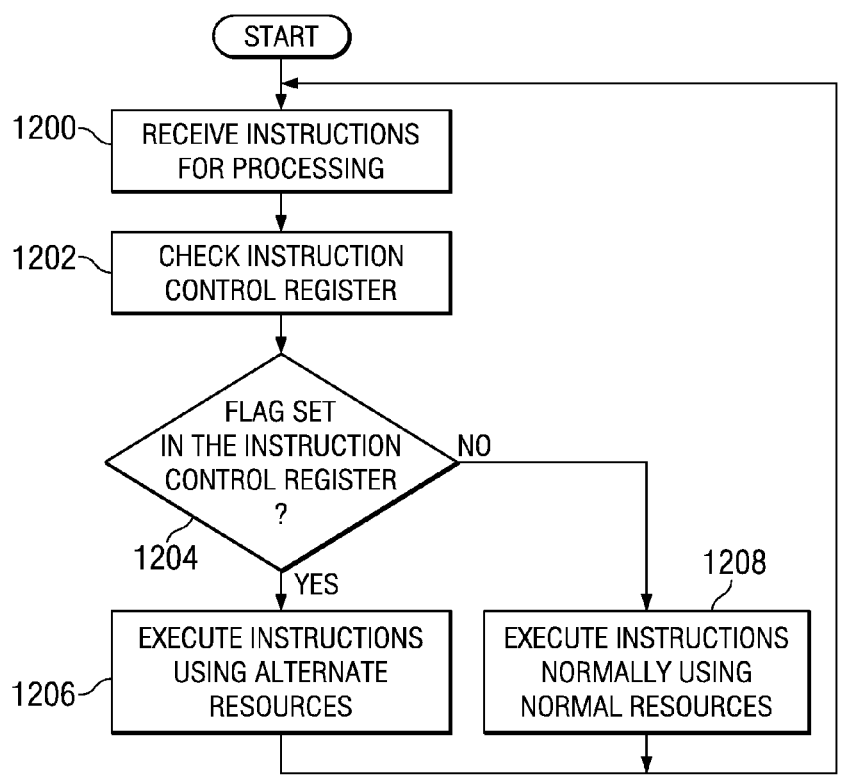

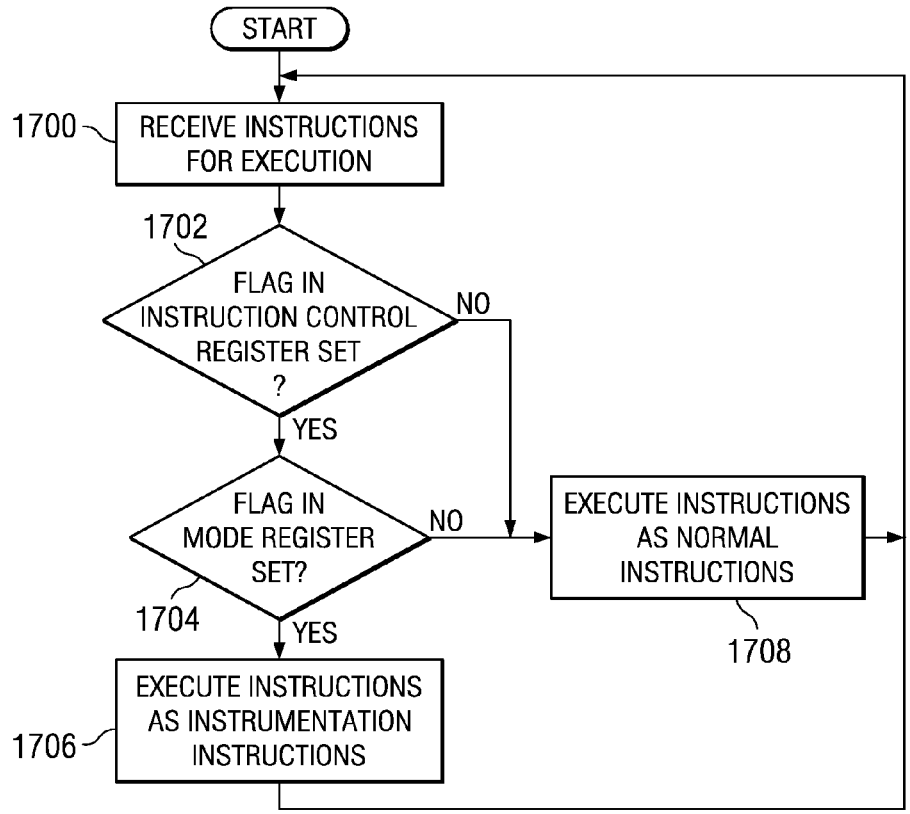

FIG. 17

```
;; application code
...
begin_instr  /‾2102
...
'' instrumentation code stream
...
end_instr  ~2104
...
;; application code
```

FIG. 21

```
;; application code
...
;; set up for instrumentation call
mov [memory_buffer], exc      ;; argument/data in memory
push memory_buffer            ;; push on stack: buffer address
push eax                      ;; push on stack: some other argument
call_instr InstrFunc          ;; int InstrFunc (int argl, char * arg2)
add esp, 8                    ;; remove arguments from stack
mov [rc], eax                 ;; save return value (always eax)
...
;; application code
```

;; instrumentation setup using MSRs: tell system instrumentation address
      range
2202— wrmsr (MSR_START_INSTRUMENTATION, instr_start_addr)
2204— wrmsr (MSR_START_INSTRUMENTATION, instr_end_addr)
      ...
      ;; application code
      ...
      Call InstrFunc    ;; somewhere between instr_start/end_addr
      ...
      ;; application code
```

*FIG. 22*

```
                                                          2300
      ;; application code
      ...
      ;; instrumentation code stream
      wrmsr (CTL_MSR, USE_INSTR)      ;; assume control bits in CTL_MSR
      ...       ;; instrumentation code
      wrmsr (CTL_MSR, ~USE_INSTR)
      ;; application code
      ...
```

...
mov ebx, [Mem_1]           2402
mov ecx, [Mem_2]            /            #pragma instrumentation(start)
imov eax, [Memory]    ;; instrumentation  void InstrFunc(void)
icall InstrFunc       ;; instrumentation  {
...                          \               if (do_start)
                             2404              start_time = GetTime();
mov ebx, [Mem_1]                             //whatever else needs to be done
mov ecx, [Mem_2]      2406                   return;
.INSTRUMENTATION       \                   }
Mov eax, [Memory]    ;; instrumentation    #pragma instrumentation(end)
Call InstrFunc       ;; instrumentation
.ENDINSTRUMENTATION    \
...                     2408
```

*FIG. 24*

METHOD AND APPARATUS FOR EXECUTING INSTRUMENTATION CODE USING PROCESSOR INSTRUCTIONS

BACKGROUND OF THE INVENTION

1. Field of the Invention

The present invention relates generally to an improved data processing system and in particular a computer implemented method and apparatus for processing data. Still more particularly, the present invention relates to computer implemented method, apparatus, and computer usable program code for collecting and processing data during the execution of code with hardware assistance.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility. A trace tool may use various techniques to provide information, such as execution flows as well as other aspects of an executing program. A trace may contain data about the execution of code. For example, a trace may contain trace records about events generated during the execution of the code. A trace also may include information, such as, a process identifier, a thread identifier, and a program counter. Information in the trace may vary depending on the particular profiling or analysis that is to be performed. A record is a unit of information relating to an event that is detected during the execution of the code.

Profiling is a process performed to extract regular and reoccurring operations or events present during the execution of code. Many different types of events may be profiled. For example, the time spent in a task or section of code, memory allocation, and most executed instructions. The results of profiling are used to optimize or increase the performance of software. Oftentimes, profiling may be used to tune or improve performance of a particular piece of software for a specific processor.

In a typical instrumented application, instrumentation code is executed as part of the application. Instrumentation code is a set of instructions used to obtain data about operations or events that occur during the execution of an application. One problem with instrumentation code is that this type of code invariably distorts the execution profile for the application. Instrumentation code competes for processor resources. These processor resources include, for example, the use of execution units, decoders, and registers. Further, the instrumentation code also competes for the use of memory and cache resources as well as input/output resources. Instrumentation code may introduce distortions in the execution profile. For example, memory and memory caches may be very heavily distorted by instrumentation code. Further, instrumentation code also can affect execution unit resources such as branch prediction logic, transfer look aside buffers (TLBs), instruction pipelines and instruction caches.

SUMMARY OF THE INVENTION

The present invention provides a computer implemented method, apparatus and computer program product for processing instructions. A determination is made as to whether an instruction is a start instrumentation instruction in response to identifying the instruction for execution while executing the instructions using a normal set of processor resources in a processor. Subsequent instructions are executed using an alternate set of processor resources until an end instrumentation instruction is encountered.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a flowchart of a process for executing instructions in accordance with an illustrative embodiment;

FIG. 12 is a flowchart of a process for executing instructions using different resources in accordance with an illustrative embodiment;

FIG. 17 is a flowchart of a process illustrating the execution of instructions in different modes in accordance with an illustrative embodiment;

FIG. 20 is a diagram illustrating controls for placing a processor into an instrumentation mode in accordance with an illustrative embodiment;

FIG. 21 is an example of instructions to change modes in accordance with an illustrative embodiment;

FIG. 22 is a diagram illustrating a use of address ranges in accordance with an illustrative embodiment;

FIG. 23 is a diagram illustrating the use of a MSR or control register bit in accordance with an illustrative embodiment; and FIG. 24 is a diagram illustrating code for marking instructions on a per instruction basis in accordance with an illustrative.

DETAILED DESCRIPTION OF THE PREFERRED EMBODIMENT

Figure 1:
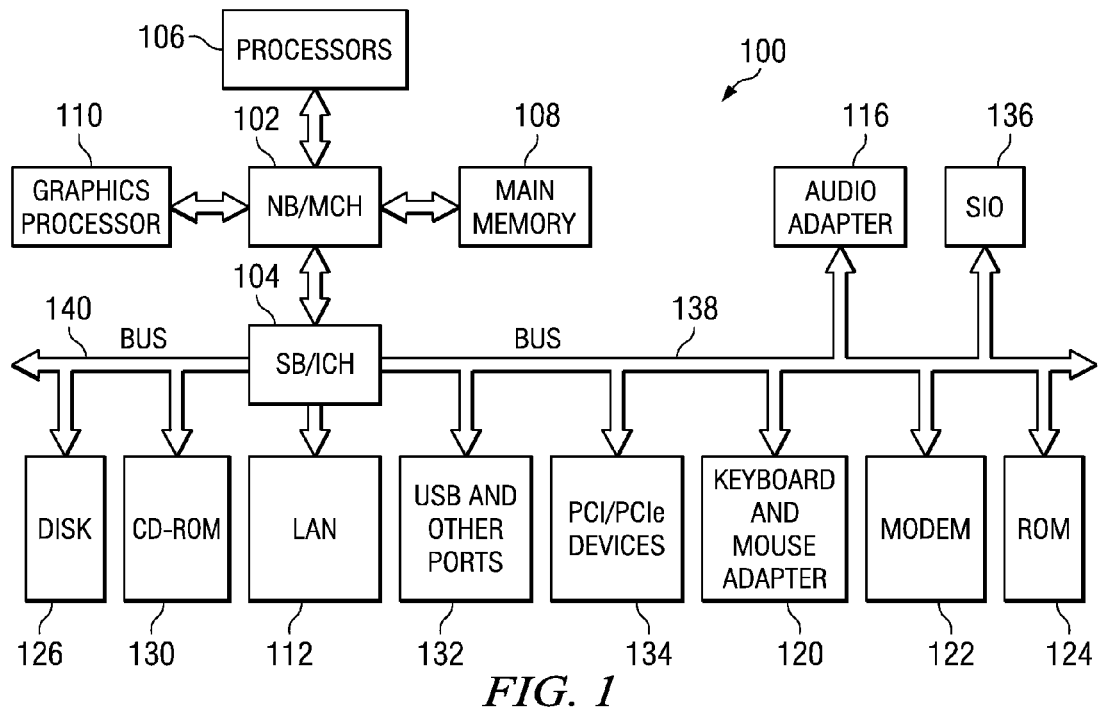
FIG. 1 is a block diagram of a data processing system in which illustrative embodiments may be implemented.

With reference now to the figures and in particular with reference to FIG. 1, a block diagram of a data processing system is shown in which illustrative embodiments may be implemented. Data processing system 100 is an example of a computer, in which code or instructions implementing the processes of the illustrative embodiment may be located. In the depicted example, data processing system 100 employs a hub architecture including a north bridge and memory controller hub (NB/MCH) 102 and a south bridge and input/output (I/O) controller hub (SB/ICH) 104. Processors 106, main memory 108, and graphics processor 110 are connected to north bridge and memory controller hub 102. Processors 106 comprise two or more processors in these examples. Graphics processor 110 may be connected to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processors 106 and coordinates and provides control of various components within data processing system 100. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100 (Java is a trademark of Sun Microsystems, Inc. in the United States, other countries, or both).

Instructions for the operating system, the object-oriented programming system, and applications or programs are located on storage devices, such as hard disk drive 126, and may be loaded into main memory 108 for execution by processors 106. The processes of the embodiments are performed by processors 106 using computer implemented instructions, which may be located in a memory such as, for example, main memory 108, read only memory 124, or in one or more peripheral devices.

Those of ordinary skill in the art will appreciate that the hardware may vary depending on the implementation. Other internal hardware or peripheral devices, such as flash memory, equivalent non-volatile memory, or optical disk drives and the like, may be used in addition to or in place of the hardware. Also, the processes for illustrative embodiments may be applied to a multiprocessor data processing system.

In some illustrative examples, a bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples are not meant to imply architectural limitations.

Figure 2:
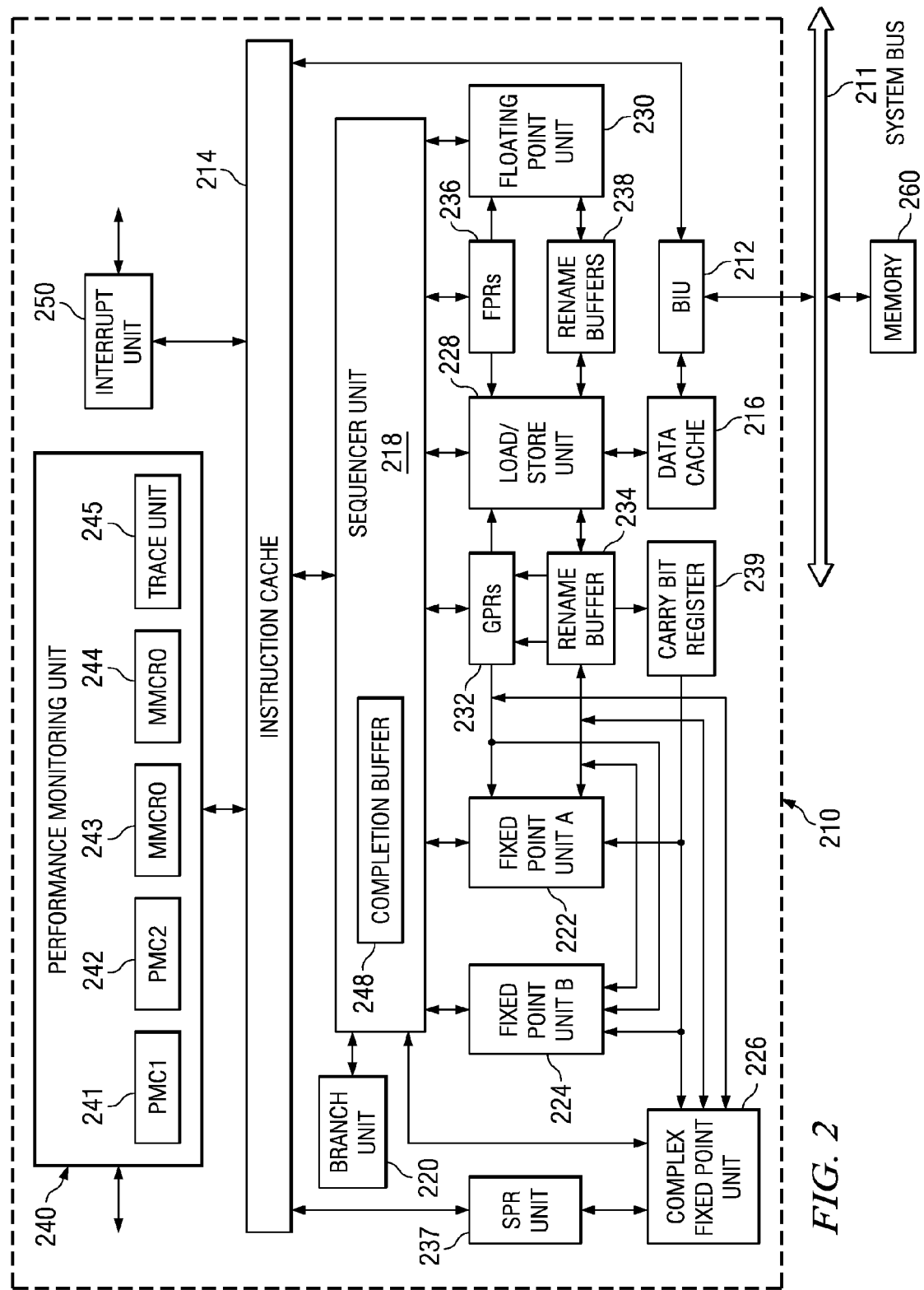
FIG. 2 depicts a block diagram of a processor system for processing information in accordance with an illustrative embodiment.

Next, FIG. 2 depicts a block diagram of a processor system for processing information in accordance with an illustrative embodiment. Processor 210 may be implemented as processor 106 in FIG. 1.

In an illustrative embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 connects to a bus interface unit ("BIU") 212 of processor 210. BIU 212 controls the transfer of information between processor 210 and system bus 211.

BIU 212 connects to instruction cache 214 and data cache 216 of processor 210. Instruction cache 214 outputs instructions to sequencer unit 218 and sequencer unit 218 selectively outputs instructions to other execution circuitry of processor 210, such as branch unit 220, a fixed-point unit A ("FXUA") 222, fixed-point unit B ("FXUB") 224, complex fixed-point unit ("CFXU") 226, load/store unit ("LSU") 228, and floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a load instruction received from sequencer unit 218, LSU 228 inputs data from data cache 216 and copies such data to selected ones of rename buffers 234 and 238. If such data is not stored in data cache 216, then data cache 216 receives (through BIU 212 and system bus 211) the data from a system memory 260. Moreover, data cache 216 outputs the data to system memory 260 via through BIU 212 and system bus 211. In response to a store instruction received from sequencer 218, LSU 228 inputs data from a selected one of GPRs 232 and FPRs 236 and copies this data to data cache 216.

Sequencer unit 218 inputs and outputs instructions to and from GPRs 232 and FPRs 236. From sequencer unit 218, branch unit 220 inputs instructions and signals indicating a present state of processor 210. In response to such instructions and signals, branch unit 220 outputs, to sequencer unit 218, signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As execution units store data at a selected one of rename buffers 234, the execution units associate this data with a storage location (e.g. one of GPRs 232 or carry bit (CA) register 239) as specified by the instruction for which the selected rename buffer is allocated. Sequencer unit 218 generates signals to cause data stored at a selected one of rename buffers 234 to be copied to its associated one of GPRs 232 or CA register 239. Sequencer unit 218 directs such copying of information stored at a selected one of rename buffers 234 in response to "completing" the instruction that generated the information. Such copying is called "writeback."

Execution units store data at a selected one of rename buffers 238. These execution units cause the association of data with one of FPRs 236. Sequencer 218 generates signals that cause data stored at a selected one of rename buffers 238 to be copied to its associated one of FPRs 236. Sequencer unit 218 directs such copying of data at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, processor 210 processes each instruction as a sequence of stages, each being executable in parallel with stages of other instructions. Such a technique is called "pipelining." In an illustrative embodiment, processor 210 processes an instruction normally as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions. In the dispatch stage, sequencer unit 218 selectively dispatches up to four decoded instructions to selected ones of execution units 220, 222, 224, 226, 228, and 230 after reserving rename buffer entries in rename buffers 234 and 238 for the dispatched instructions' results (destination operand information). In the dispatch stage, sequencer unit 218 supplies operand information to the selected execution units for dispatched instructions. Processor 210 dispatches instructions in order of their programmed sequence.

In the execute stage, execution units, such as execution units 220, 222, 224, 226, 228, and 230, execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete" by placing this indication in completion buffer 248. Processor 210 "completes" instructions in the order of their programmed sequence.

In the writeback stage, sequencer 218 directs the copying of data from rename buffers 234 and 238 to GPRs 232 and FPRs 236, respectively.

Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, instructions each require one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248, within sequencer 218, is used to track the completion of the multiple instructions that are being executed within the execution units, such as execution units 220, 222, 224, 226, 228, and 230. Upon an indication in completion buffer 248 that an instruction or a group of instructions have been completed successfully, in an application specified sequential order, completion buffer 248 may be utilized to initiate the transfer of the results of those completed instructions to the associated general-purpose registers, such as GPRs 232.

In addition, processor 210 also includes performance monitoring unit 240, which is connected to instruction cache 214 as well as other units in processor 210. Operation of processor 210 can be monitored utilizing performance monitoring unit 240, which in this illustrative embodiment is a software-accessible mechanism capable of providing detailed information descriptive of the utilization of instruction execution resources and storage control.

Although not illustrated in FIG. 2, performance monitoring unit 240 couples to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, cycles, completed instructions, and cache hits.

Performance monitoring unit 240 includes an implementation-dependent number (e.g., 2-8) of counters 241-242, labeled PMC1 and PMC2, which are utilized to count occurrences of selected events. Performance monitoring unit 240 further includes at least one monitor mode control register (MMCR). In this example, two control registers, MMCRs 243 and 244, specify the function of counters 241-242. Counters 241-242 and MMCRs 243-244 are preferably implemented as special purpose registers (SPRs) that are accessible for read or write via MFSPR (move from SPR) and MTSPR (move to SPR) instructions executable by CFPU 226. However, in one alternative embodiment, counters 241-242 and MMCRs 243-244 may be implemented simply as addresses in I/O space.

In another alternative embodiment, the control registers and counters may be accessed indirectly via an index register. This embodiment is implemented in the IA-64 architecture in processors from Intel Corporation.

The various components within performance monitoring unit 240 may be used to generate data for performance analysis. Depending on the particular implementation, the different components may be used to generate trace data. In other illustrative embodiments, performance monitoring unit 240 may provide data for time profiling with support for dynamic address to name resolution. When providing trace data, performance monitoring unit 240 may include trace unit 245, which contains circuitry and logical units needed to generate traces. In particular, in these illustrative examples, trace unit 245 may generate compressed trace data.

Additionally, processor 210 also includes interrupt unit 250 connected to instruction cache 214. Although not shown in FIG. 2, interrupt unit 250 is connected to other functional units within processor 210. Interrupt unit 250 may receive signals from other functional units and initiate an action, such as starting an error handling or trap process. In these examples, interrupt unit 250 generates interrupts and exceptions that may occur during execution of a program.

Figure 3:
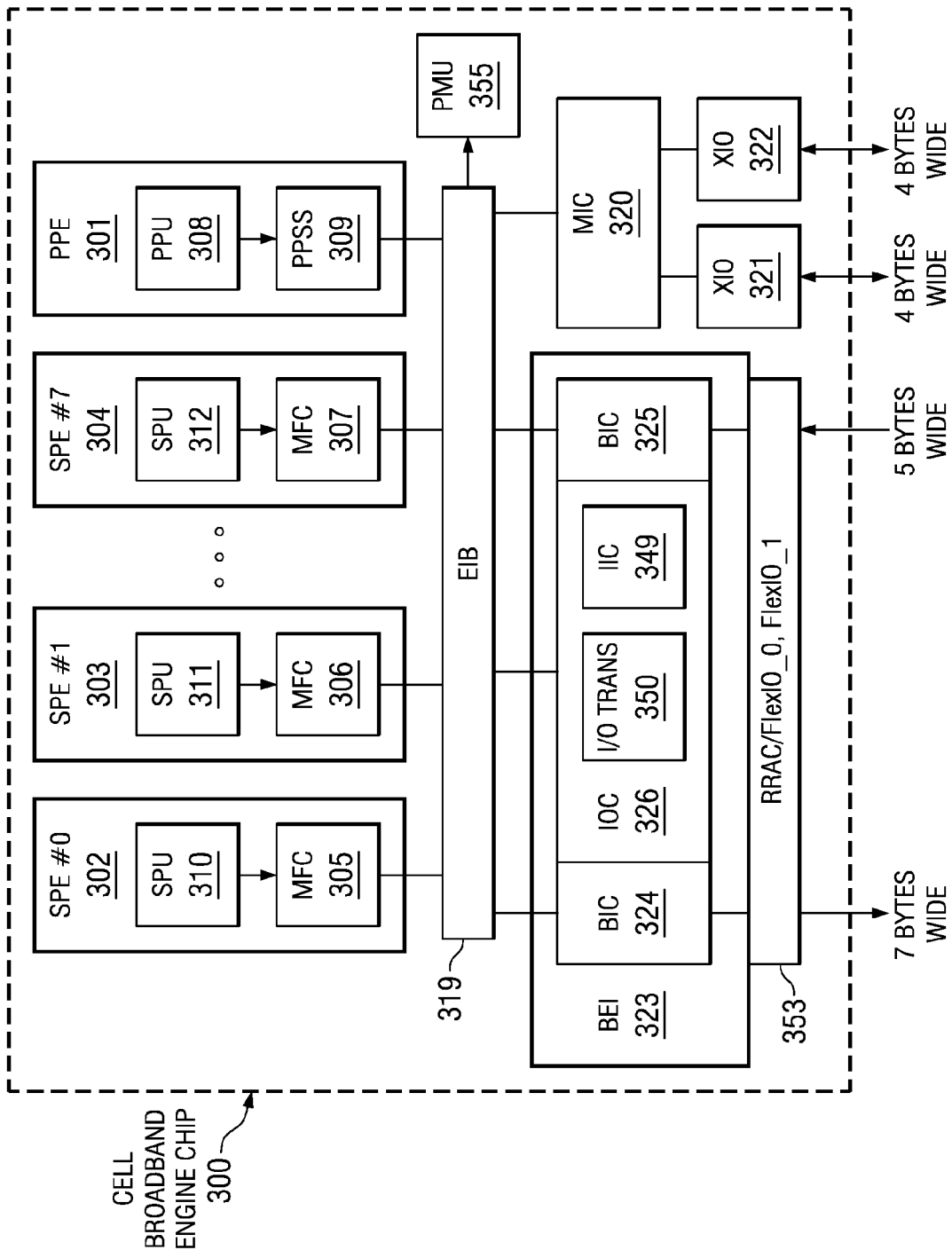
FIG. 3 is an exemplary diagram of a cell broadband engine chip in which aspects of the illustrative embodiments may be implemented in accordance with an illustrative embodiment.

FIG. 3 is an exemplary diagram of a cell broadband engine chip in which aspects of the illustrative embodiments may be implemented in accordance with an illustrative embodiment. Cell broadband engine chip 300 is a single-chip multiprocessor implementation directed toward distributed processing targeted for media-rich applications such as game consoles, desktop systems, and servers.

Cell broadband engine chip 300 may be logically separated into the following functional components: Power PC® processor element (PPE) 301, synergistic processor units (SPU) 310, 311, and 312, and memory flow controllers (MFC) 305, 306, and 307. Although synergistic processor elements and Power PC® processor elements are shown by example, any type of processor element may be supported. In these examples, cell broadband engine chip 300 implementation includes one Power PC® processor element 301 and eight synergistic processor elements, although FIG. 3 shows only three synergistic processor elements (SPEs) 302, 303, and 304. The synergistic processor element (SPE) of a CELL Processor is a first implementation of a new processor architecture designed to accelerate media and data streaming workloads.

Each synergistic processor element includes one synergistic processor unit (SPU) 310, 311, or 312 with its own local store (LS) area and a dedicated memory flow controller (MFC) 305, 306, or 307 that has an associated memory management unit (MMU) to hold and process memory protection and access permission information. Once again, although synergistic processor units are shown by example, any type of processor unit may be supported. Additionally, cell broadband engine chip 300 implements element interconnect bus (EIB) 319 and other I/O structures to facilitate on-chip and external data flow.

Element interconnect bus 319 serves as the primary on-chip bus for Power PC® processor element 301 and synergistic processor elements 302, 303, and 304. In addition, element interconnect bus 319 interfaces to other on-chip interface controllers that are dedicated to off-chip accesses. The on-chip interface controllers include the memory interface controller (MIC) 320, which provides two extreme data rate I/O (XIO) memory channels 321 and 322, and cell broadband engine interface unit (BEI) 323, which provides two high-speed external I/O channels and the internal interrupt control for the cell broadband engine 300. The cell broadband engine interface unit 323 is implemented as bus interface controllers (BIC0 & BIC1) 324 and 325 and I/O interface controller (IOC) 326. The two high-speed external I/O channels connected to a polarity of RRAC interfaces providing the flexible input and output (FlexIO_0 & FlexIO_1) 353 for the cell broadband engine 300.

Main storage is shared by Power PC® processor unit 308, the power processor element (PPE) 301, synergistic processor elements (SPEs) 302, 303, and 304, and I/O devices in a system. All information held in this level of storage is visible to all processors and devices in the system. Programs reference this level of storage using an effective address. Since the memory flow controller synergistic processor unit command queue and the memory flow controller proxy command queue and control and status facilities are mapped to the effective address space, it is possible for power processor element 301 to initiate direct memory access operations involving a local store area associated with any of synergistic processor elements (SPEs) 302, 303, and 304.

A synergistic processor unit program accesses main storage by generating and placing a direct memory access data transfer command, with the appropriate effective address and local store address, into its memory flow controllers (MFCs) 305, 306, or 307 command queue for execution. When executed, the required data are transferred between its own local store area and main storage. Memory flow controllers (MFCs) 305, 306, or 307 provide a second proxy command queue for commands generated by other devices such as the power processor element (PPE) 301. The proxy command queue is typically used to store a program in local storage prior to starting the synergic processor unit. Proxy commands can also be used for context store operations.

The effective address part of the data transfer is much more general, and can reference main storage, including all synergistic processor unit local store areas. These local store areas are mapped into the effective address space. The data transfers are protected. An effective address is translated to a real address through a memory management unit. The translation process allows for virtualization of system memory and memory protection.

Power PC® processor element 301 on cell broadband engine chip 300 consists of 64-bit Power PC® processor unit 308 and Power PC® storage subsystem 309. Synergistic processor units (SPU) 310, 311, or 312 and memory flow controllers 305, 306, and 307 communicate with each other through unidirectional channels that have capacity. The channel interface transports messages to and from memory flow controllers 305, 306, and 307, synergistic processor units 310, 311, and 312.

Element interconnect bus 319 provides a communication path between all of the processors on cell broadband engine chip 300 and the external interface controllers attached to element interconnect bus 319. Memory interface controller 320 provides an interface between element interconnect bus 319 and one or two of extreme data rate I/O cell memory channels 321 and 322. Extreme data rate (XDR™) dynamic random access memory (DRAM) is a high-speed, highly serial memory provided by Rambus. The extreme data rate dynamic random access memory is accessed using a macro provided by Rambus, referred to in this document as extreme data rate I/O cell memory channels 321 and 322.

Memory interface controller 320 is only a slave on element interconnect bus 319. Memory interface controller 320 acknowledges commands in its configured address range(s), corresponding to the memory in the supported hubs.

Bus interface controllers (BIC) 324 and 325 manage data transfer on and off the chip from element interconnect bus 319 to either of two external devices. Bus interface controllers 324 and 325 may exchange non-coherent traffic with an I/O device, or it can extend element interconnect bus 319 to another device, which could even be another cell broadband engine chip. When used to extend the element interconnect bus, coherency is maintained between caches in the cell broadband engine and caches in the external device attached.

I/O interface controller 326 handles commands that originate in an I/O interface device and that are destined for the coherent element interconnect bus 319. An I/O interface device may be any device that attaches to an I/O interface such as an I/O bridge chip that attaches multiple I/O devices or another cell broadband engine chip 300 that is accessed in a non-coherent manner. I/O interface controller 326 also intercepts accesses on element interconnect bus 319 that are destined to memory-mapped registers that reside in or behind an I/O bridge chip or non-coherent cell broadband engine chip 300, and routes them to the proper I/O interface. I/O interface controller 326 also includes internal interrupt controller (IIC) 349 and I/O address translation unit (I/O Trans) 350. Cell broadband engine chip 300 also contains performance monitoring unit (PMU) 355. In this example, performance monitoring unit 355 contains counters, registers and logics similar to performance monitoring unit 240 in FIG. 2. These registers may be memory mapped to allow access to the registers by other processors.

Although specific examples of how the different components may be implemented have been provided, this is not meant to limit the architecture in which the aspects of the illustrative embodiments may be used. The aspects of the illustrative embodiments may be used with any multi-processor systems, such as, multi-core processors.

The illustrative embodiments provide a computer implemented method, apparatus and computer usable program code for executing instrumented code. Instrumented, in these examples, is code that is executed to obtain information about the execution of an application by hardware. Different embodiments provide hardware assistance, as well as software, for executing instrumentation code in a manner to minimize distortion or interference in obtaining a profile of the manner in which an application executes. One embodiment includes using a register to determine whether instrumentation instructions should be executed. In the illustrative embodiments, instrumentation instructions are executed only when the processor is in an instrumentation mode. Instrumentation instructions are unexecuted if the processor is not in an instrumentation mode. Unexecuted means that the processor does not execute the instruction. In other words, the instruction is skipped.

Further, another illustrative embodiment allows for identification of a target processor for executing the instrumentation instructions. The identification of the target processor may be the current processor or another processor. This identification may be made in the same place indicator for whether the processor is in an instrumentation mode. In this example, this identification information is located in fields within a register in the processor. With the identification of a target processor, the processor currently executing the instruction stream may either execute the instrumentation instructions itself or send those instructions to a target processor for execution in these examples.

Further, each processor may have duplicate resources, that is, a normal set of resources and an alternate set of resources. The normal resources are used when the processor normally executes while the alternate resources are used when the processor executes in an instrumentation mode. In this manner, the state of the normal resources is not disturbed when the processor uses the instrumentation resources to execute instrumentation instructions.

A selection of a target processor may be formed in a number of different ways. For example, the target may be chosen through the instrumentation code itself. The particular selection made by the instrumentation code may be selected by a user, at random, based on the locality of a nearby processor or some other criteria.

In sending instructions to another processor in an instrumentation mode, the architectural context is packaged for use by the target processor. This packaged information is placed in some location that the target processor knows to look to find the information. The architectural context information about the state of a processor is processor dependent. Typically, this information includes the set of registers supported by the Instruction Set Architecture (ISA). For example, this information may be placed in some shared memory or cache that is accessible by other processors. As a result, the architectural context in each processor may be available to all other processors. The architectural context may be made available in a number of different ways. For example, this information may be copied from the source to the target. Additionally, this information may be made available by packaging the context along with the instructions to be executed.

In these examples, the architectural context includes, for example, the state of registers, such as general purpose registers and floating point registers. By using the architectural context of the primary processor, the instrumentation processor may continue executing instructions as if they were being executed on the primary processor. Similarly, by using the architectural context of the instrumentation processor, the primary processor may continue executing as if instrumentation instructions were being executed on the primary processor. The advantage of this is that the resources of the primary processor are not being used during the execution of the instructions on the instrumentation processor.

Additionally, the illustrative embodiments also provide for marking a set of instructions within code as a set of instrumentation instructions. The marking of instructions may take various forms, such as individual instructions or groups of instructions. The groups of instructions may be marked in various ways, such as by page, address, file, or object. The different embodiments also allow for the use of start and stop instructions in which a start instruction results in the processor using an alternate set of processor resources until an end instruction in encountered. In this manner, the alternate set of resources may be used for various purposes, such as instrumentation of the program being run. Further, this alternate set of processor resources may be employed for other purposes other than instrumentation, such as, executing instructions using resources designed for multimedia, video, audio, or graphics processing.

Furthermore, the different embodiments described herein also provide a graphical user interface that may be used to select instructions for marking. The instructions may be marked prior to the program being executed or during execution of the program. This type of interface provides a user an ability to select portions of program to be marked for instrumentation or other purposes.

Figure 4:
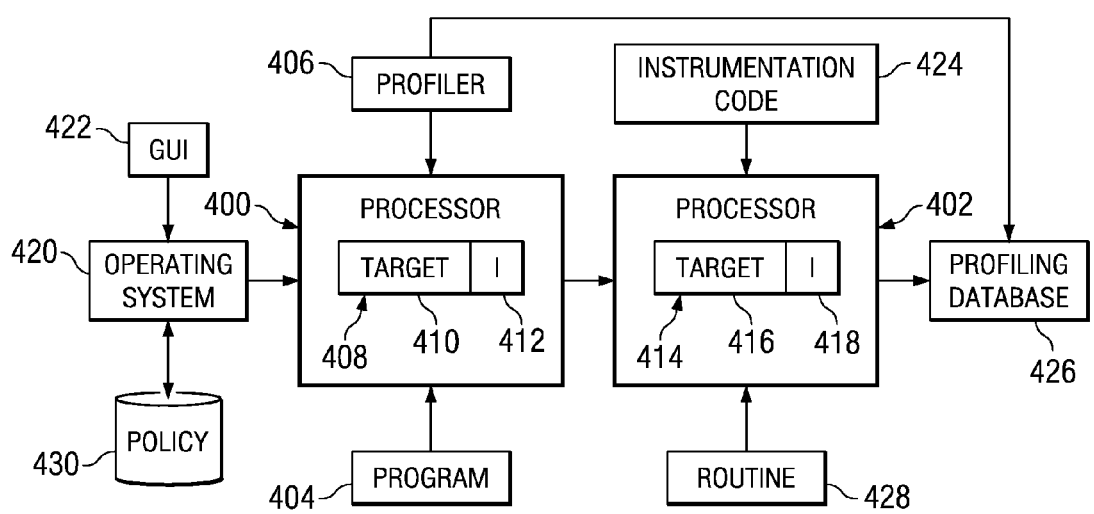
FIG. 4 is a diagram illustrating components used to place a processor into an instrumentation mode as well as providing resources to reduce distortion caused by the execution of instrumentation in accordance with an illustrative embodiment.

Turning now to FIG. 4, a diagram illustrating components used to place a processor into in an instrumentation mode as well as providing resources to reduce distortion caused by the execution of instrumentation code is depicted in accordance with an illustrative embodiment. In this example, processor 400 and processor 402 are present. These processors may be separate processors such as those found in processors 106 in FIG. 1. Alternatively, these two processors may be processor cores, such as those illustrated in broadband engine chip 300 in FIG. 3.

In this example, processor 400 executes program 404. Processor 402 also may execute profiler 406. Depending on the implementation, profiler 406 may actually be part of the instrumentation code within program 404, rather than a separate program as depicted. In these examples, profiler 406 is executed as a separate program when duplicate resources are present on processor 400. Duplicate resources are described in more detail with respect to FIG. 5 below. One primary example of a profiler is the jprof profiler developed using a Java Virtual Machine Profiling Interface (JVMPI) and Java Virtual Machine Tool Interface (JVMTI) support in the java virtual machine (JVM). U.S. Pat. No. 6,349,406 B1 provides description of its methodology for subtracting out overhead related to instrumentation as known by one of ordinary skill in the art. In that patent, only the direct cost of the instrumentation would be subtracted out, not the effect on the common resources, such as, caches.

Profiler 406 performs processes used to extract regular and reoccurring operations or events that occurred during the execution of program 404. This data obtained during the execution of program 404 forms profiling data. The profiling data is generated by executing instrumentation instructions that may be included within program 404. These instrumentation instructions also are referred to as instrumentation code.

In these illustrative examples, processor 400 contains instrumentation configuration register 408. Instrumentation configuration register 408 includes target field 410 and mode field 412. In a similar fashion, processor 402 contains instrumentation configuration register 414, which has target field 416 and mode field 418.

In this example, the execution of instrumentation code by processor 400 occurs when the mode of processor 400 changes. In these depicted examples, the mode changes by setting mode field 412 in processor 400.

While executing program 404, processor 400 checks instrumentation configuration register 408. If a flag is set in the mode field 412, instructions executed while the flag is set are treated as instrumentation code. Depending on the particular implementation, all of the code executed during this time may be treated as instrumentation code or selectively marked code may be treated as instrumentation code.

Instrumentation configuration register 408 may be set in a number of different ways. For example, instructions within program 404 may set instrumentation configuration register 408. Alternatively profiler 406 may set instrumentation configuration register 408. This register also may be set through operating system 420 or graphical user interface (GUI) 422.

This instrumentation code may be executed by processor 400 or by another processor 402. The identification of the hardware to execute the instrumentation code is identified through target field 410. This target field contains an identifier of the processor or other processor resources that is to execute the instrumented code for program 404. Depending on the implementation, the instrumented code may be located within program 404. Alternatively, instrumented code may be a separate set of code, such as instrumentation code 424. If mode field 412 is not set, any instrumented code in program 404 and instrumentation code 424 is ignored.

Instrumentation code in a JVM may check to see if a callout to a profiler is required. Instrumentation in a profiler may produce call stacks and accumulated metric data as for example depicted in U.S. Pat. No. 6,349,406. Alternatively, instrumentation code may be simply tracing the flow of an application or system by recording every taken branch or every exit/entry to instrumented routines. Using the instrumentation mode, the instrumentation code may be executed without affecting the resources on the primary program being monitored.

If processor 402 executes instrumentation code 424 or instrumented code from program 404 in response to mode field 412 being set and target field 410 indicating that processor 402 is to execute the instrumented code, then instrumented code running on processor 402 stores data generated by instrumentation code 424 in profiling database 426. The collection of data for profiling database 426 may be performed through routine 428, in these examples.

When control is passed to routine 428, executed by processor 402, the state of processor 400 is saved and locked into a read only state to prevent changes until after instrumentation code 424 completes execution and data is stored in profiling database 426 by routine 428. The new state is loaded into processor 400 and control returns to processor 400 to continue executing program 404.

Depending on the implementation, processor 400 may execute instrumented code within program 404 rather than executing a separate set of code, as shown in instrumentation code 424 with respect to processor 402. In this case, profiler 406 may be used to collect data when instrumented code within program 404 is executed by processor 400. Profiler 406 then stores the profiling data generated by executing the instrumented code into profiling database 426 for later analysis.

In these examples, mode field 412 or 418 may be dynamically set during the execution of program 404. For example, operating system 420 may selectively set mode field 412 and select a target processor to execute the instrumented code.

Instrumentation configuration register 408 may be set based on policy 430. In the depicted examples, policy 430 is a set of rules and data that dictate under what circumstances instrumentation configuration register 408 may be set to place processor 400 into an instrumentation mode. For example, policy 430 may set instrumentation configuration register 408 if a particular user is logged into the data processing system. As another example, policy 430 may dictate that mode field 412 in instrumentation configuration register 408 is set into an instrumentation mode based on the number of times program 404 has been executed. Of course, other types of rules may be used to determine when mode field 412 is set to place processor 400 into an instrumentation mode when executing a program, such as program 404.

Further, a user, through GUI 422, may place processor 400 into an instrumentation mode during the execution of program 404. For example, when executing program 404, profiler 406 may provide data that may indicate to a user that certain sections of code should be instrumented. GUI 422 may display program 404 in a graphical manner to allow the user to see different modules or units within program 404. GUI 422 also may display a frequency of execution for the different modules or sections. As a result, the user may mark different modules or sections of program 404 for instrumentation. This type of marking may occur before or during execution of program 404 by processor 400. The GUI may be used to select programs to run in the instrumentation mode. The determination of which part of the program are instrumentation is typically performed as part of the compiling of the application. The application writer uses compiler or assembler directives to mark the portions of code that are instrumentation code.

Figure 5:
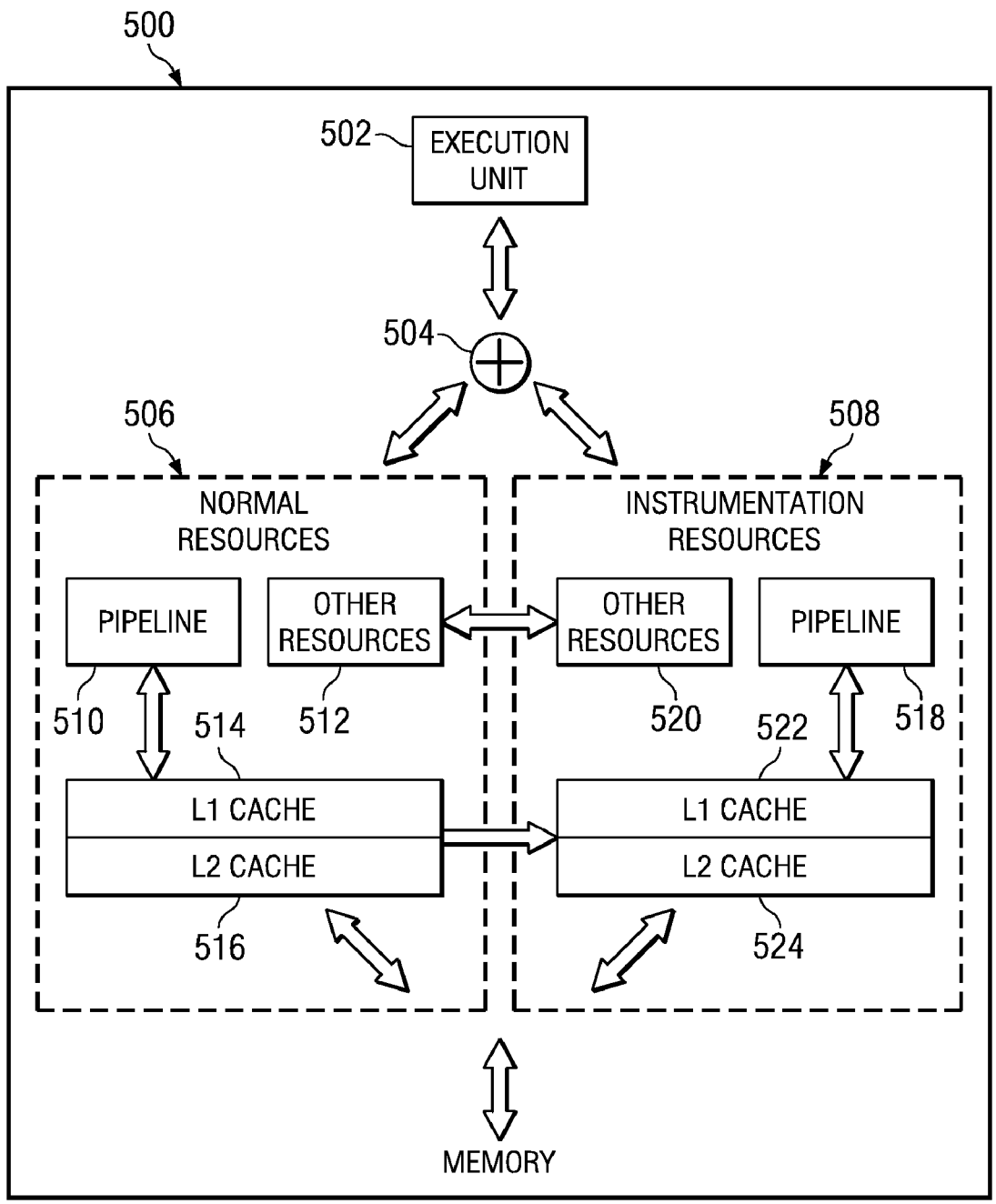
FIG. 5 is a diagram illustrating resources in a processor in accordance with an illustrative embodiment.

Turning now to FIG. 5 a diagram illustrating resources in a processor is depicted in accordance with an illustrative embodiment. In this example, processor 500 is a more detailed example of a processor, such as processor 400 in FIG. 4. Only portions of components within processor 500 are illustrated for purposes of showing the different aspects of the illustrative embodiments.

In this example, execution unit 502 performs operations and calculations called for by instructions. Resources used by execution unit 502 are controlled by instrumentation control 504. Instrumentation control 504 provides execution unit 502 access to normal resources 506 or instrumentation resources 508. Instrumentation control 504 selects one of these two sets of resources for use by execution unit 502 depending on the current mode of processor 500. Normal resources 506 are used during normal execution of instructions, while instrumentation resources 508 are used when a processor is in an instrumentation mode. Instrumentation control 504 determines the set of resources to use based on a register, such as instrumentation configuration register 408 in FIG. 4. Instrumentation control 504 may be implemented in components that use these resources. Each component, such as, the cache unit or branch prediction unit must know which resources to use. The flag indicating which resource to use is passed to the unit as the instructions are being executed.

Normal resources 506 contains pipeline 510, other resources 512, L1 cache 514, and L2 cache 518. Other resources 512 include, for example, a translation look aside buffer, performance counters, and system registers, as examples. Instrumentation resources 508 contains pipeline 518, other resources 520, L1 cache 522, and L2 cache 524. Other resources 520 contains resources similar to other resources 512.

Normal resources 506 are used during normal execution of instructions. When processor 500 is placed into an instrumentation mode, in these examples, execution unit 502 uses instrumentation resources 508 instead of normal resources 506 to execute instructions. The state of instrumentation resources 508 is the same as normal resources 506. This mirroring or duplication of resources in these examples may be accomplished in a number of different ways. Not all normal resources, however, need to be duplicated, depending on the implementation. For example, changes to normal resources 506 may be automatically updated in instrumentation resources 508 as the changes occur. Alternatively, when processor 500 is placed into an instrumentation mode, the state of normal resources 506 may be copied over to instrumentation resources 508. In another embodiment, resources in 508 may be left unaltered as execution proceeds using normal resources.

In this manner, the different resources are not corrupted or altered during the execution of instructions in an instrumentation mode. As a result, when processor 500 returns to a normal mode of execution, normal resources 506 are intact and ready for use. In these illustrative examples, normal resources 506 are locked in a read only state when processor 500 enters an instrumentation mode. The control of locking and copying and updating resources is performed by instrumentation control 504 in these examples.

Thus, the state of normal resources 506 are untouched or changed by any type of profiling or instrumentation process that is executed during an instrumentation mode. This instrumentation mode also is referred to as a shadow mode. By using these alternative resources, processor resource interference caused by an operating system or instrumentation is minimized in these examples because the normal resources remain unchanged.

Further, the illustrative examples only show two sets of resources. Of course, there can be any number of sets of resources depending on the particular implementation. In these examples, instrumentation resources 508 does not necessarily have to contain all of the resources found in normal resources 506, which may cause the processor to run at a slower rate or speed. Duplicated resources include, for example, architecture registers, such as control registers, e-flags, debug registers and system MSRs. Examples of other duplicated resources include execution unit decoders and pipelines, such as pipeline 510 and pipeline 518. Management hardware such as a global description table (GDT), interrupt description table (IDT), segment registers, and translation look aside buffers also are duplicated in these examples. Examples of resources that are not duplicated include general purpose registers and floating point registers. Additionally, resources such as performance counters, and single instruction stream, multiple data stream (SIMD) type resources are not needed. Depending on the implementation, caches also do not need to be duplicated.

Normal resources 506 may be accessed in instrumentation mode in some cases because only limited resources may be duplicated in instrumentation resources 508 depending on the implementation. In other words, normal resources 506 and instrumentation resources 508 are not necessarily exactly the same in these examples. For example, an alternate branch unit resources may be absent. Access to normal resources that have alternative resources, however, are in a read only manner such that changes cannot be made to those during execution of instructions in an instrumentation mode. Instrumentation resources 508 are also referred to as a set of alternate resources.

The use of this type of shadowing or duplication of hardware may be implemented in special purpose processors that are designed or configured for software development and testing. Additionally, this type of hardware may be used by performance analysis tools to instrument code and execute the instrumented code.

Additionally, applications may use this type of resources for recovery and exception code processing and as well as executing debug code. Operating systems may use the instrumentation resources 508 to run interrupt handlers, execute instrumentation code, and debug code. Resources in normal resources 506 that may be accessed during execution in instrumentation mode include, for example, performance counters and instruction pointer, and some system registers. By keeping the normal resources 506 and instrumentation resources 508 synchronized, a switch between an instrumentation mode and a normal mode may be made quickly during execution of instructions.

A number of different mechanisms may be used in the illustrative embodiment to indicate whether an instruction is to be considered as an instrumentation instruction. One mechanism involves tagging each individual instruction. Alternatively, groups or ranges of instructions may be designated. For example, all instructions within a page, an address range, an object, a file, or a function or method may be marked as instrumentation instructions. Regardless of how instructions are tagged, the processor ignores these instructions if the instrumentation mode is not set for the processor. Typically, the application writer will identify the code that is instrumentation code via compiler/assembler directives. When the code is loaded, the loader marks the instructions using the hardware specific mechanisms available.

When the instrumentation mode is set and the target processor is the same processor, that processor executes the instructions. If the register indicates that the processor is in an instrumentation mode and the target is another processor, the processor sends the instructions and the required architectural state to the target processor.

Depending on the implementation, the instrumentation code may be in a separate location other than the code being executed. With this type of instrumentation code, the processor sends architectural state information and access control to a target processor to execute the code. If the target processor is the same processor, then no architectural state is passed. Instead, the processor may switch and use duplicate resources or the same resources to execute the instrumented code.

Figure 6A:
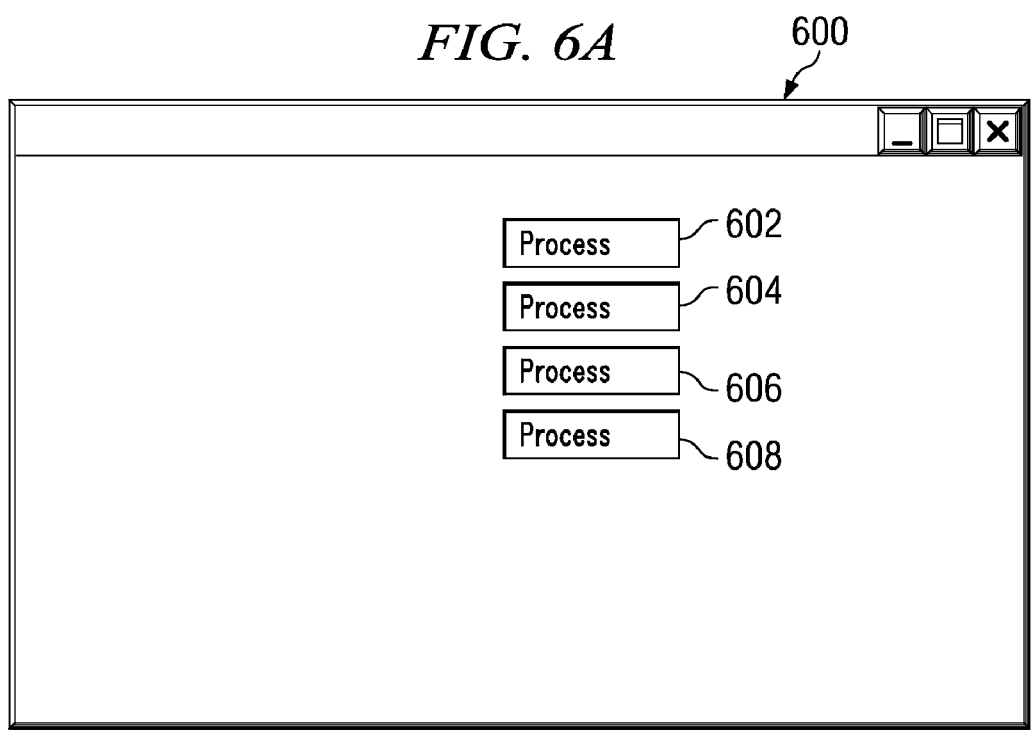
FIG. 6A is a diagram illustrating a graphical user interface (GUI) or marking instructions in accordance with an illustrative embodiment.
Figure 6B:
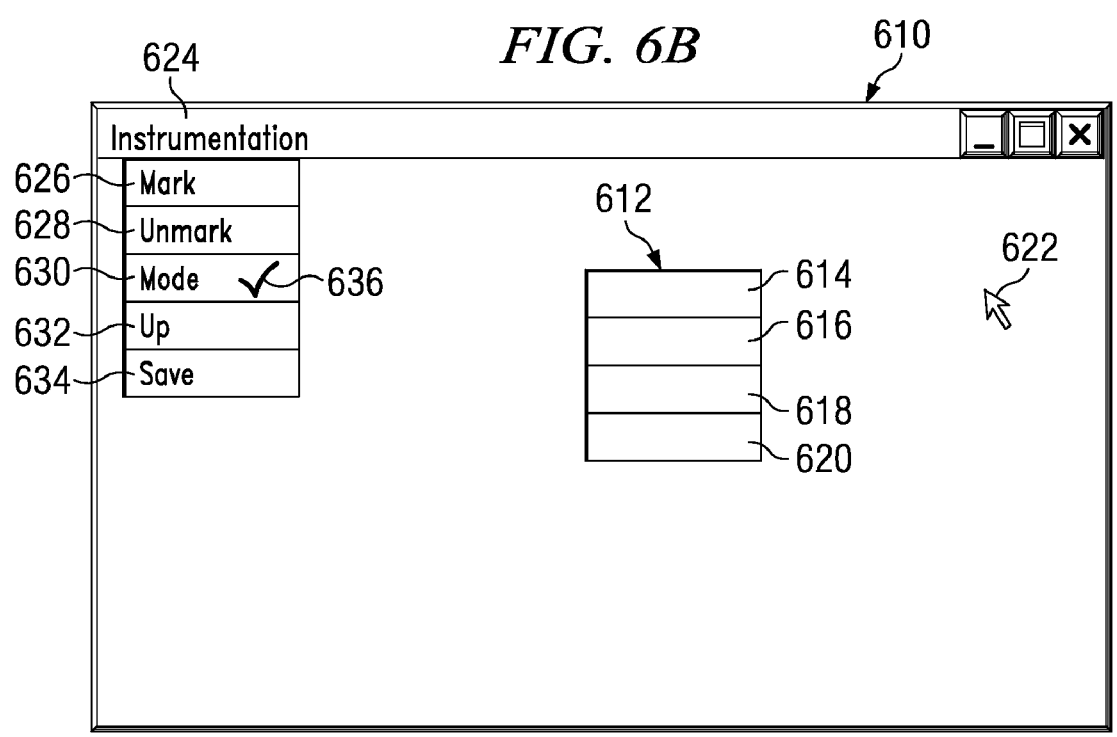
FIG. 6B is a diagram of another graphical user interface in accordance with an illustrative embodiment.

Turning now to FIGS. 6A and 6B, diagrams illustrating a graphical user interface (GUI) for marking instructions is depicted in accordance with an illustrative embodiment. In this example, in FIG. 6A graphical user interface 600 is an example of an interface that may be implemented for GUI 422 in FIG. 4. Graphical user interface 600 contains an identification of processes 602, 604, 606, and 608. These are examples of processes that are executing on a processor during execution of one or more programs. Additionally, these processes may be from the same program or different programs depending on the particular implementation. In these examples, the user may select one of these processes presented in GUI 422 to receive a more detailed presentation of the different threads or modules that may be executing within a selected process.

Turning to FIG. 6B, a diagram of another graphical user interface is depicted in accordance with an illustrative embodiment. In this example, graphical user interface 610 illustrates code 612 for a process, such as process 602 in FIG. 6A. Code 612 is a graphical illustration of this process and represents different sections within code 612, rather than depicting actual instructions in these examples. As illustrated, code 612 contains sections 614, 616, 618, and 620. Each of these sections represents some grouping of instructions within code 612. These graphical representations of groupings may be, for example, different subroutines or modules within code 612. A section may even be an individual instruction, in some cases, depending on the particular implementation. A user may select a section, such as 618, resulting in all of code for that section being marked as instrumentation code. This type of selection and marking is performed dynamically during execution of a program in these examples.

Further, graphical user interface 610 also may identify a section that is currently being executed as well as providing indicators of which sections are being executed more often that others. This type of indication may be presented using different mechanisms. For example, different colors may be used to indicate the frequency of execution for different sections.

Alternatively, graphical user interface 610 may be used prior to execution of code 612. In this manner, a user may select sections of code 612 for instrumentation prior to code 612 being executed. With a non-dynamic selection of code, graphical user interface 610 also may present code 612 using addresses or line numbers. Further, individual instructions also may be displayed in graphical user interface 610, rather that graphical representations of different groupings of code.

In this example, a grouping of instructions in code 612 may be selected using pointer 622. Pointer 622 is controlled by a pointing device, such as a mouse or track ball in these examples. Selection of section 614 through pointer 622 results in that section of code being highlighted or otherwise graphically marked to indicate its selection. The instructions in that section may then be manipulated through instrumentation menu 624. In this example, instrumentation menu 624 contains the menu options Mark 626, Unmark 628, Mode 630, Up 632, and Save 634. By selecting the menu option Mark 626, any code selected or highlighted in graphical user interface 610 is then marked. Code may be unmarked by selecting Unmark 628.

The selection of Mode 630 places the processor in an instrumentation mode if the processor is not in an instrumentation mode. If the processor already is in an instrumentation mode, the selection of this entry takes the processor out of instrumentation mode. In other words, Mode 630 acts as a toggle to change modes for the processor in these examples. The mode is indicated through indicator 634 in these examples. When indicator 636 is displayed in Mode 630, the processor is in the instrumentation mode. The particular selection of this entry results in an instrumentation configuration register, such as instruction configuration register 408 in FIG. 4, being set to cause the processor to execute instructions marked for instrumentation. This setting of register may occur using, for example, an operating system in response to an input to graphical user interface 610 selecting Mode 630.

In these examples, pointer 622 may used to mark one or more sections of code 612. Up entry 632 allow the user interface to return to displaying processes as illustrated in graphical user interface 600 in FIG. 6A. Save entry 634 may be selected by a user to save or commit the changes to the code 612. In other words, marking sections of code 612 will not result in those marked sections being marked as instrumentation code unless the user selects save entry 634 to save the changes.

Figure 7:
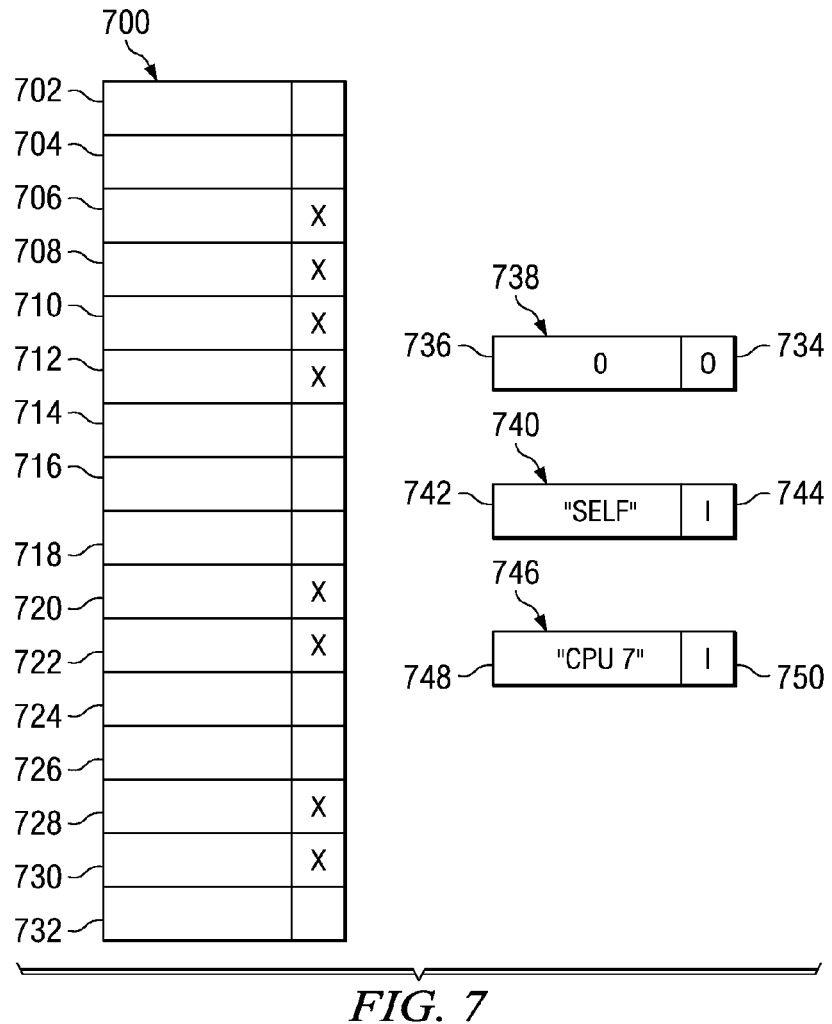
FIG. 7 is a diagram illustrating flagged instructions within code in accordance with an illustrative embodiment.

Turning now to FIG. 7, a diagram illustrating flagged instructions within code is depicted in accordance with an illustrative embodiment. In this example, code 700 contains instructions 702-732. Instructions 706, 708, 710, 712, 720, 722, 728, and 730 are marked instructions that have been flagged for handling when the processor is in instrumentation mode.

Instruction control register values 734, 740, and 746 are example values that can be set in the instruction control register. In the first example, register 734 contains a null or 0 value in both target field 736 and mode field 738. With these values in register 734, the processor is not in an instrumentation mode. As a result, the processor does not execute instructions 706, 708, 710, 712, 720, 722, 728, and 730. The other unmarked instructions in code 700 are executed by the processor.

In another example, register 740, target field 742 is identified as "self". Mode field 744 indicates that the processor is in an instrumentation mode. The processor executes all of the instructions in code 700 because register 740 indicates that instrumentation mode is on.

Finally, in another example, register 746 indicates that the processor identified as "cpu 7" is the target processor in target field 748. Mode field 750 indicates that the processor is in an instrumentation mode. In this case, the processor sends instructions 706, 708, 710, 712, 720, 722, 728, and 730 to the identified processor along with the architectural state required by the processor to execute theses instructions.

After sending an instruction or instruction block, the processor waits for the target processor to complete executing the instruction or instruction block. In this case, an instruction block is, for example, instruction 706, 708, 710, 712. The target processor returns the modified or updated architectural state for the sending processor to continue execution. If the changes by the instrumentation code are not needed by the normal code, then there is no need to return the state. In fact, in some cases, it is better not to update the state. This situation fits in well with the case where the instrumentation code is not executed at all. A case where it might be helpful to restore state would be a call to instrumentation code that returned a return code, which was checked by the caller and a different path of code was executed depending on the return code.

In FIG. 7, the instructions are flagged in these examples by using an unused bit, which might be used as a bundle indicator in the IA64 architecture. Of course, different indicators may be used depending on the particular implementation, such as, a special prefix to indicate instrumentation instructions.

Figure 8:
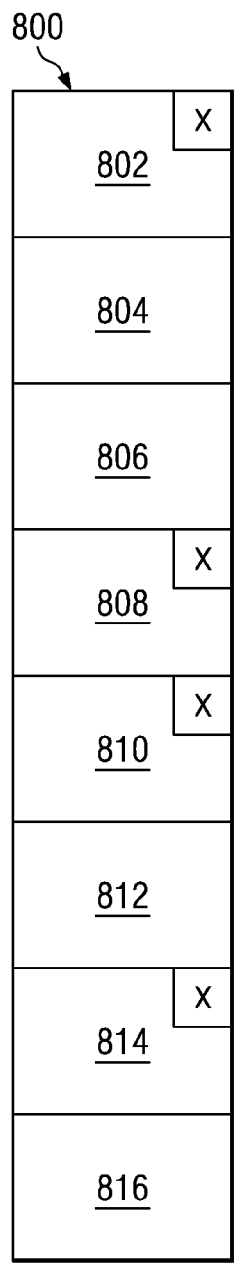
FIG. 8 is a diagram illustrating page tables in accordance with an illustrative embodiment.

Turning now to FIG. 8, a diagram illustrating page tables is depicted in accordance with an illustrative embodiment. In these examples, code 800 is described by page table entries 802, 804, 806, 808, 810, 812, 814, and 816. Page table entries 802, 808, 810, and 814 are marked as instrumentation page table entries. As a result, the processor does not execute any of the instructions in these marked page tables if the processor is not in an instrumentation mode. If the processor is in an instrumentation mode, the processor executes the instructions in the page table entries are marked as instrumentation code.

As can be seen, only one entry or section in each page table needs to be marked to indicate that the page table contains instrumented code. Alternatively, individual instruction ranges may be identified within the page table entries rather than marking the entire set of instructions in the page table entry as instrumentation instructions.

Figure 9:
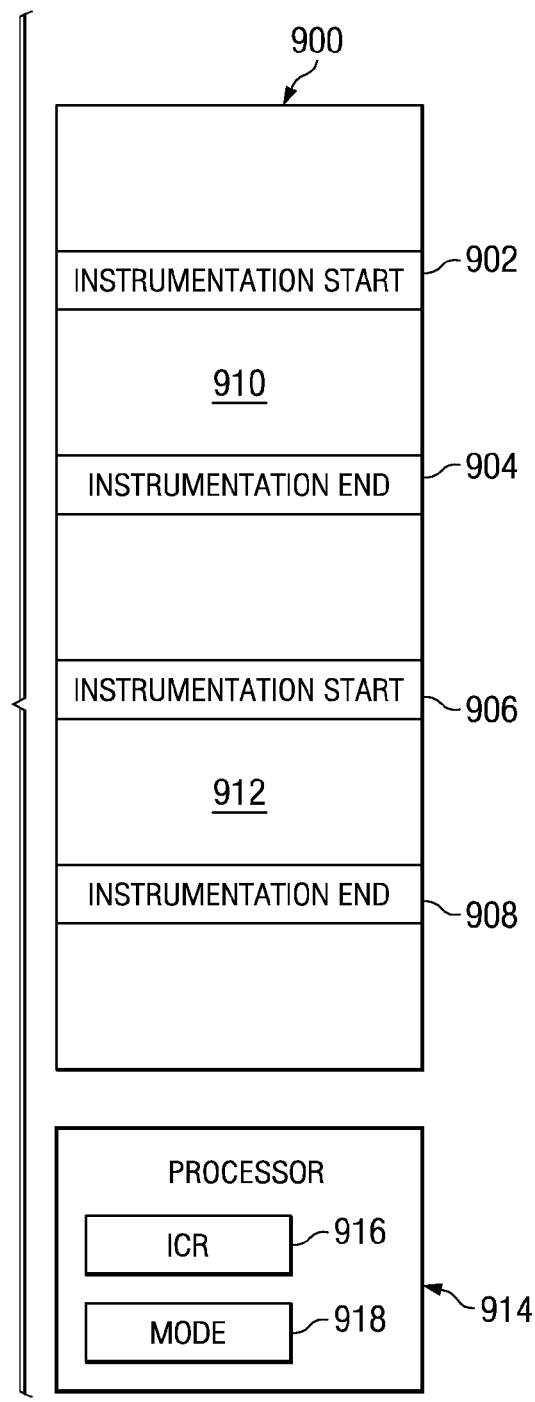
FIG. 9 is a diagram illustrating start and stop instructions in code executed by a processor in accordance with an illustrative embodiment.

Turning now to FIG. 9, a diagram illustrating start and stop instructions in code executed by a processor is depicted in accordance with an illustrative embodiment. In this example, code 900 contains start instructions 902 and 906 along with end instructions 904 and 908.

Instructions in section 910 and 912 within program 900 are instrumentation instructions. In this example, section 910 is defined by instrumentation start instruction 902 and instrumentation end instruction 904. Section 912 is defined by instrumentation start instruction 906 and instrumentation end instruction 908. These instructions are executed when the processor is in an instrumentation mode in these examples.

In these examples, when processor 914 encounters an instrumentation start instruction, such as instrumentation start instruction 902, processor 914 determines whether instrumentation configuration register (ICR) 916 indicates that an instrumentation mode is present. After receiving the instrumentation start instruction, the instruction cache unit sets the instrumentation mode and ensures that all the fetched instructions are executed in instrumentation mode until the stop instrumentation instruction is executed at which time it resets the instrumentation mode. Alternatively, when the start/stop instrumentation mode instructions are executed, control may be transferred to an operating system routine that sets/resets the state. Instrumentation configuration register 916 may be implemented in the same manner as instrumentation configuration register 408 in FIG. 4.

If the processor 914 is in an instrumentation mode, a flag or indicator is set in mode register 918. This register indicates that all of the instructions to be executed are executed as instrumentation instructions while the flag in this register is set. When the flag is not set, the instructions are executed normally. When processor 914 is in a normal mode, instructions in section 910 are not executed.

In this manner specific instructions do not have to be flagged or marked as instrumentation instructions. As a result, calls may be made to routines to have those routines considered instrumentation code even though these routines are not marked or tagged. Thus, routines, like a C library, may be considered instrumentation code even though such routines may be executed by a different program or a different thread in the same or different program.

Figure 10:
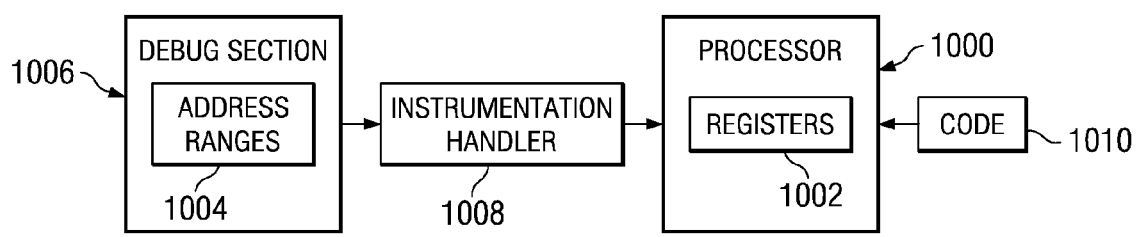
FIG. 10 is a diagram illustrating execution of instructions based on address ranges in accordance with an illustrative embodiment.

Turning now to FIG. 10, a diagram illustrating execution of instructions based on address ranges is depicted in accordance with an illustrative embodiment. In this example, processor 1000 contains registers 1002. These registers are used to store address ranges 1004 in debug section 1006. In these examples, registers 1002 are located within an instruction unit, such as instruction cache 214 in FIG. 2. Instruction cache 214 in FIG. 2 uses registers 1002 to define instruction ranges. Further, registers 1002 may be existing registers or the instruction cache may be modified to include registers 1002 to define instruction ranges. Instrumentation handler 1008 stores address ranges 1004 in registers 1002.

Processor 1000 executes code 1010. The address ranges stored in registers 1002 identify which instructions are instrumentation instructions. The instructions within the address ranges are executed when processor 1000 is in an instrumentation mode. Instrumentation handler 1008 stores address ranges 1004 into registers 1002 prior to processor 1000 executing code 1010. Again, this storage of addresses may be performed by a loader at the time the program is loaded.

As can be seen from the depicted examples, the different embodiments work with sets of instructions that are marked as instrumentation instructions. A set of instructions is one or more instructions. The different embodiments may be applied to a single instruction or to multiple instructions. The grouping of instructions in a set of instructions has been shown in different manners in the above embodiments. The groupings, in these examples, include a single instruction, a page of instructions, and an address range for instructions. The groupings of instructions that fall into a set of instructions also may be grouped or designated using other constructs. For example, set of instructions may be grouped by instructions in an object file or in a method.

With reference now to FIG. 11, a flowchart of a process for executing instructions is depicted in accordance with an illustrative embodiment. The process illustrated in FIG. 11 may be implemented in a component such as processor 400 in FIG. 4.

The process begins by identifying a set of instructions for execution (step 1100). The process then determines if the processor is in instrumentation mode (step 1102). If the processor is in instrumentation mode in step 1102, the process executes the set of instructions (step 1104) and terminates thereafter.

Turning back to step 1102, if the process determines the processor is not in instrumentation mode, the process skips the set of instructions (step 1106) and terminates thereafter.

With reference now to FIG. 12, a flowchart of a process for executing instructions using different resources is depicted in accordance with an illustrative embodiment. The process in FIG. 12 may be implemented in an execution unit in a processor such as processor 400 in FIG. 4.

The process begins by receiving instructions for processing (step 1200). Next, the process checks the state of instruction control register (step 1202). In these examples, the register, is for example instrumentation configuration register 408 in FIG. 4. In particular, mode field 412 in FIG. 4 within this register is checked. The process then determines if a flag is set in the instruction control register (step 1204). If a flag is set in step 1204, the process executes instructions using alternate resources (step 1206) and the process returns to step 1200 thereafter.

Turning back to the determination made in step 1204, if the process determines a flag is not set in the instruction control register, the process executes instructions using normal resources (step 1208). The process then returns to step 1200.

Figure 13:
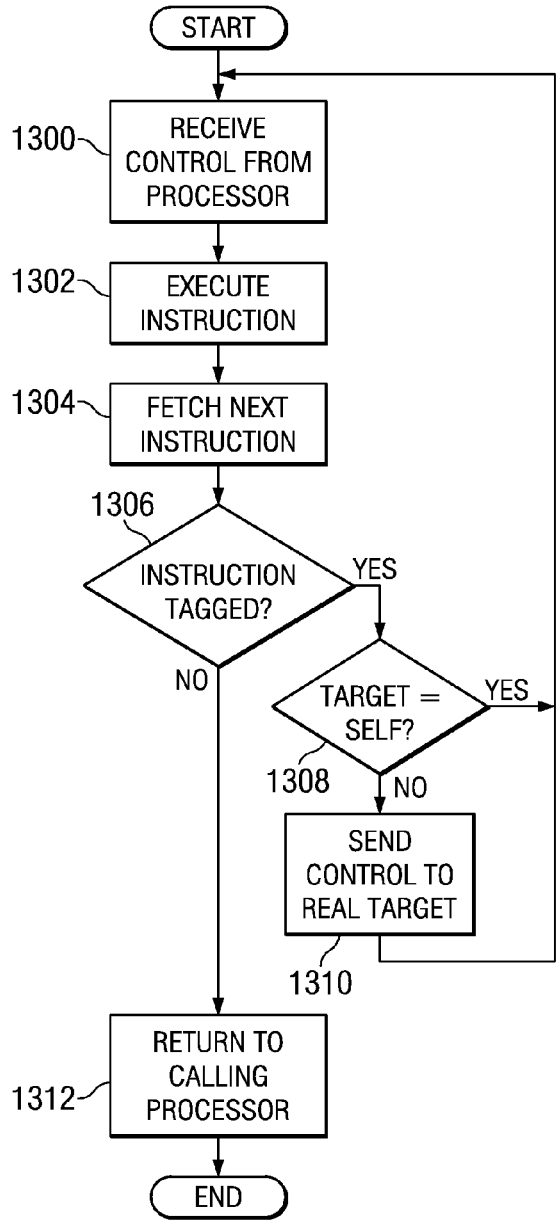
FIG. 13 is a flowchart of a process followed by a processor that has been designated as a target to execute instrumentation instructions in accordance with an illustrative embodiment.

In FIG. 13, a flowchart of a process followed by a processor that has been designated as a target to execute instrumentation instructions is depicted in accordance with an illustrative embodiment. The process illustrated in FIG. 13 may be implemented in a component such as instruction cache unit 214 in FIG. 2 or in an execution unit.

The process begins by receiving control from the processor originating the instructions (step 1300). The process then executes that instruction (step 1302) and fetches the next instruction (step 1304). The process then determines if the instruction is tagged (step 1306). If the instruction is tagged in step 1306, the process determines if the target is set equal to self (step 1308). If the process determines the target is not set equal to self in step 1308, the process sends control to the real target (step 1310) with the process returning to step 1300 thereafter. In this case, execution of additional instrumentation instructions or code may be directed towards yet another processor depending on the particular implementation. This redirection is accomplished by setting the target to a processor other than the current processor in this example. If in step 1308, the process determines the target is set equal to self, the process returns to step 1300.

Turning back to step 1306, the process determines the instruction is not tagged, the process returns to the calling processor (step 1312) with the process terminating thereafter. In step 1312, the target processor has finished executing instrumentation instructions or as encountered normal code within the code that should be executed by the calling processor rather than the target processor.

Figure 14:
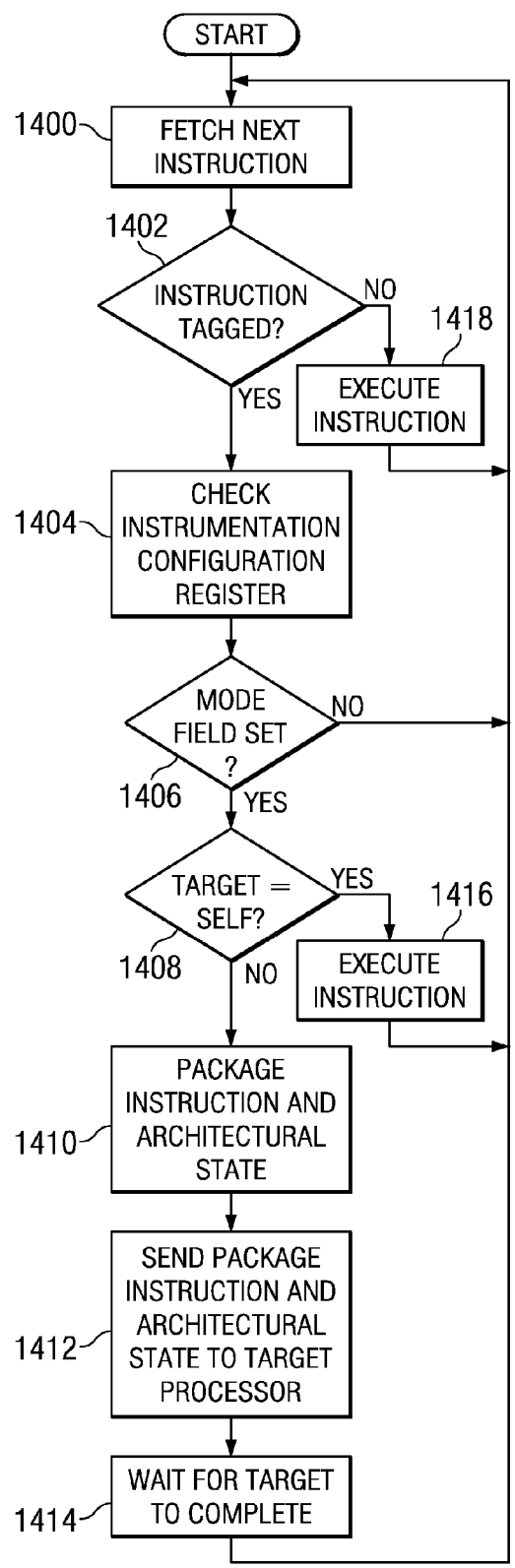
FIG. 14 is a flowchart of a process illustrating the execution of instructions by an execution unit in a processor in accordance with an illustrative embodiment.

Turning now to FIG. 14, a flowchart of a process illustrating the execution of instructions by an execution unit in a processor is depicted in accordance with an illustrative embodiment. The process illustrated in FIG. 14 may be implemented in a component such as sequencer unit 218 of FIG. 2.

The process begins by fetching the next instruction (step 1400). The process determines if the instruction is tagged (step 1402). If the instruction is tagged in step 1402, the process checks the instrumentation configuration register (step 1404). The process then determines if the mode field is set (step 1406). If the mode field is set in step 1406, the process further determines if the target is set equal to self (step 1408).

If the target is not set equal to self in step 1408, the process packages the instruction and architectural state (step 1410). The process then sends the packaged instruction and architectural state to the target processor (step 1412) and waits for the target processor to complete processing (step 1414). When target processor completes processing and returns control, the process then returns to step 1400 to fetch the next instruction.

Turning back to step 1408, if the process determines the target is set equal to self, the process executes instructions (step 1416) and returns to step 1400 to fetch the next instruction. If in step 1406, the process determines if the mode field is not set, it returns to step 1400 to fetch the next instruction. Turing further back to step 1402, if the process determines the instruction is not tagged, the process executes the instruction (step 1418) and returns to step 1400 to fetch the next instruction.

Figure 15:
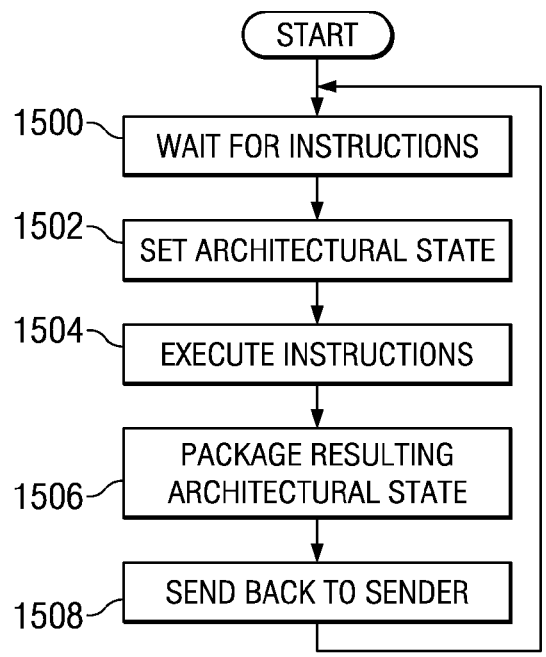
FIG. 15 is a flowchart of a process illustrating the processing of instructions at a target processor in accordance with an illustrative embodiment.

Turning now to FIG. 15, a flowchart of a process illustrating the processing of instructions at a target processor is depicted in accordance with an illustrative embodiment. The process illustrated in FIG. 15 may be implemented in a component such as instruction cache unit 214 of FIG. 2.

The process begins by waiting for instructions (step 1500). Then, the architectural state is set (step 1502), and instructions are executed (step 1504). Next, the process packages the resulting architectural state (step 1506) and sends it back to the sender (step 1508) and returns to wait for instructions at step 1500.

Figure 16:
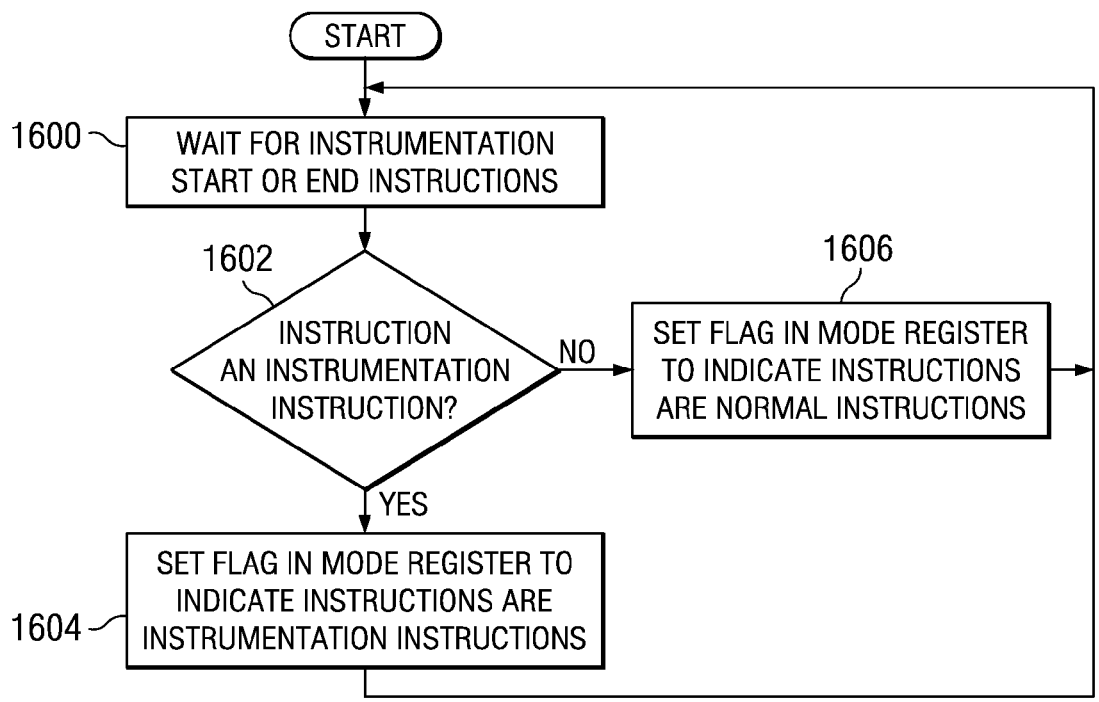
FIG. 16 is a flowchart of a process illustrating the execution of instructions containing start and end instructions in accordance with an illustrative embodiment.

Turning now to FIG. 16, a flowchart of a process illustrating the execution of instructions containing start and end instructions is depicted in accordance with an illustrative embodiment. The process illustrated in FIG. 16 may be implemented in a component such as instruction cache unit 214 of FIG. 2.

The process begins by waiting for instrumentation start or end instructions (step 1600). The process then determines if the instruction is an instrumentation instruction (step 1602). If the instruction is an instrumentation instruction in step 1602, the process sets a flag in mode register to indicate instructions are instrumentation instructions (step 1604). The process returns to step 1600 to wait for the next start or end instruction.

If the determination is made that the instructions are not instrumentation instructions in step 1602, the process sets a flag in mode register to indicate instructions are normal instructions (step 1606). The process returns to step 1600 to wait for the next start or end instruction.

Turning now to FIG. 17, a flowchart of a process illustrating the execution of instructions in different modes is depicted in accordance with an illustrative embodiment. The process illustrated in FIG. 17 may be implemented in a component such as instruction cache unit 214 of FIG. 2.

The process begins by receiving instructions for execution (step 1700). The process determines if a flag in the instruction control register is set (step 1702). If it is set, the process determines if a flag in the mode register is set (step 1704). If it is set, the process executes the instructions as instrumentation instructions (step 1706) with the process then returning to step 1700 as described above. In step 1706, the instructions are executed as an instrumentation instruction using an alternate set of processor resources in these examples. In particular, these instructions are executed using instrumentation resources, such as instrumentation resources 508 in FIG. 5.

Alternatively, normal resources may be used while executing a program, such as profiler 406 in FIG. 4.

Turning back to step 1704, if the processor determines that a flag in the mode register is not set, the process executes the instructions an normal instructions without generating any profiling data (step 1708). The process returns to step 1700 to receive the next instruction, as described above. Turning further back to step 1702, if the process determines that a flag in the instruction control register is not set, the process also proceeds to step 1708 execute instructions as normal instructions.

Although the alternative set of resources are described and depicted as instrumentation resources in the illustrative examples, these alternate processor resources may take other forms. For example, the alternate processor resources may be processor resources that are optimized for graphics or multimedia. These resources may be on a separate processor depending on the implementation. With this type of implementation, the mode register is used to determine whether the instructions will be executed using a "mode" that is specific to the set of alternate resources rather than to determine whether the instruction will be executed in an instrumentation mode. For example, the mode register may indicate that the instructions after the start instruction are to be executed using multimedia processor resources that are specific to processing multimedia content.

Figure 18:
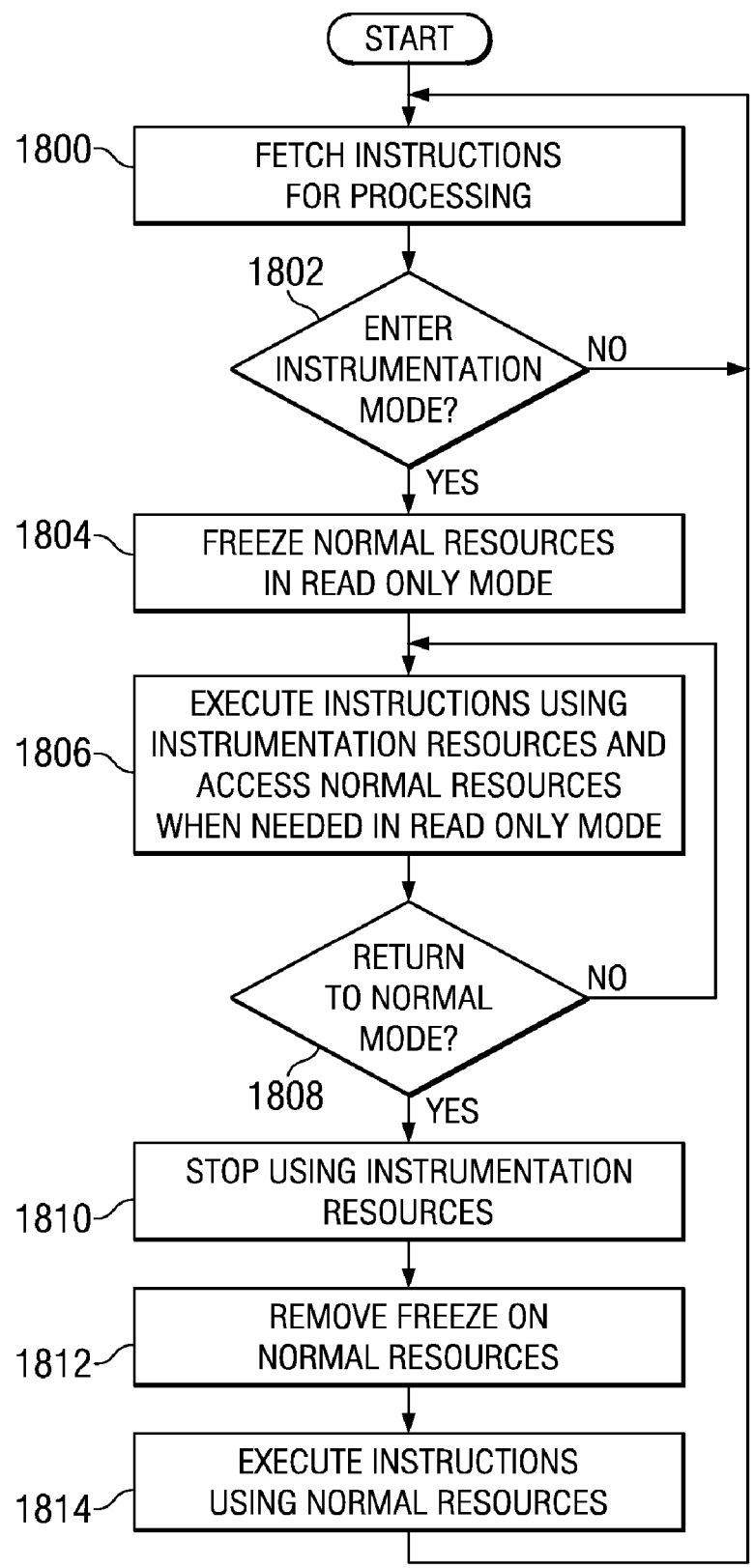
FIG. 18 is a flowchart of a process illustrating steps used by a control mechanism to alternate between the use of normal and instrumentation resources in accordance with an illustrative embodiment.

Turning now to FIG. 18, a flowchart of a process illustrating steps used by a control mechanism to alternate between the use of normal and instrumentation resources is depicted in accordance with an illustrative embodiment. The process illustrated in FIG. 18 may be implemented in a component such as instruction cache unit 214 of FIG. 2 or any other unit, such as the branch unit.

The process begins by fetching instructions for processing (step 1800). The process then makes a determination on whether to enter instrumentation mode (step 1802). In this example, the determination in step 1802 is made by checking a mode field in a register in the manner described above. If the process enters instrumentation mode in step 1802, normal resources are frozen or placed into read only mode (step 1804). Instructions are executed using instrumentation resources and access to normal resources when needed, is in the read only mode (step 1806). As a result, the normal resources are not allowed.

The process then determines whether to return to normal mode (step 1808). The determination in step 1806 is made by checking the mode field to see whether the indicator or flag is still set. If the process returns to normal mode in step 1808, the processor stops using instrumentation resources (step 1810). The freeze on normal resources is removed (step 1812), and instructions are executed using normal resources (step 1814) with the process returning to step 1802. Depending on the implementation, resources may not be frozen or placed into read only mode. Instead, the resources may just be unused.

If in step 1808, the process determines not to return to normal mode, the process returns to step 1806. Turning further back in the process to step 1802, if the process does not enter instrumentation mode, the process returns to step 1800 to fetch additional instructions for processing.

Figure 19:
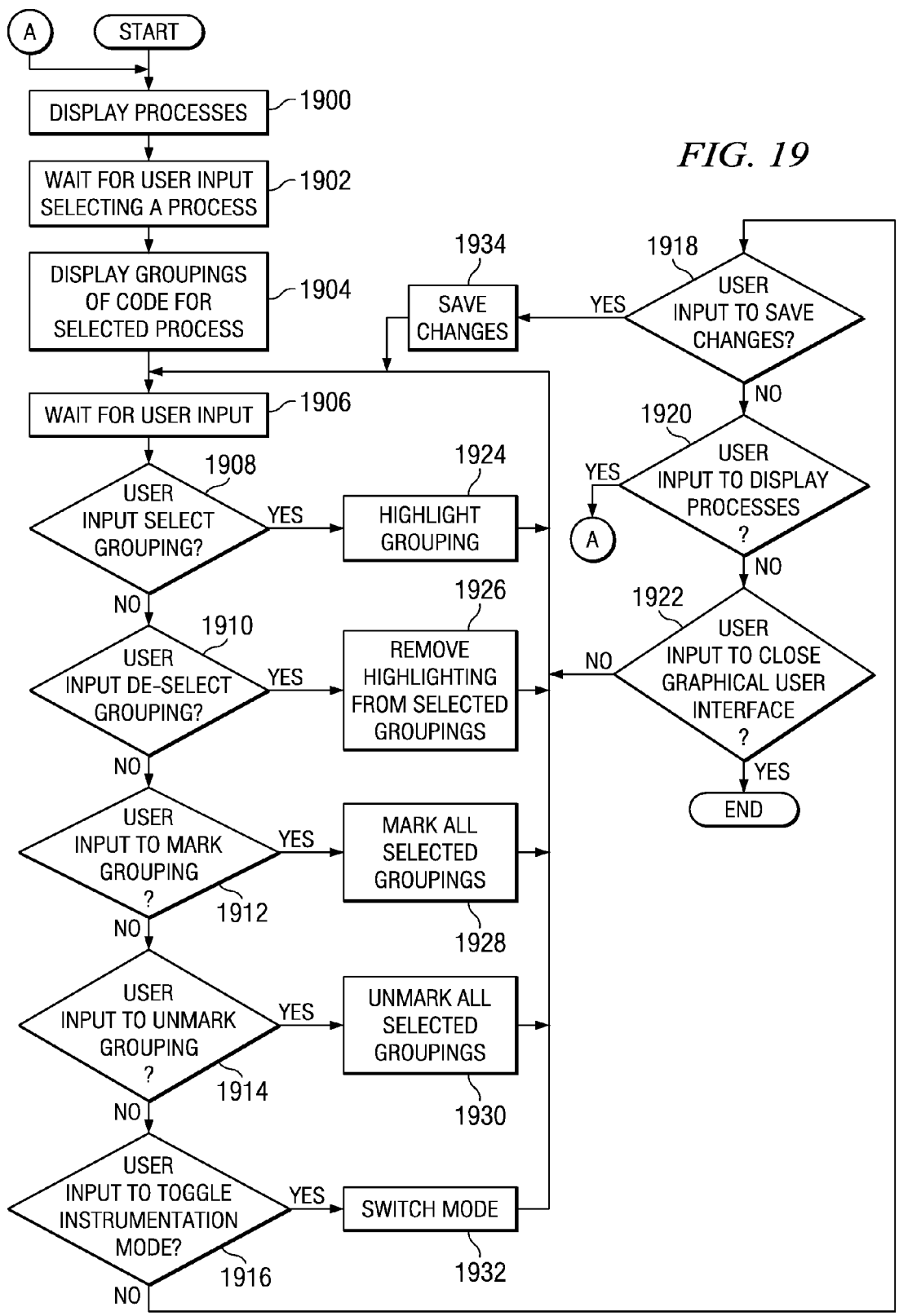
FIG. 19 is a flowchart of a process for marking code through a graphical user interface for instrumentation in accordance with an illustrative embodiment.

Turning now to FIG. 19, a flowchart of a process for marking code through a graphical user interface for instrumentation is depicted in accordance with an illustrative embodiment. The processes illustrated in FIG. 19 may be implemented in a graphical user interface, such as graphical user interface 422 in FIG. 4. The process begins by displaying processes in a graphical user interface (step 1900). These processes are ones that are being executed by the processor. The processes may be for a single program or for multiple programs. The process waits for user input for selecting a process (step 1902). Groupings of code are displayed for the selected process (step 1904). The mode switches or toggles between an instrumentation mode and a normal mode in these examples. The process then waits for user input (step 1906). In these examples, the user input is received in the graphical user interface through a user manipulated pointing device, such as a mouse or track ball.

At this point in the process, several determinations are made. The process determines if the user input selects a grouping (step 1908). If no grouping is selected in step 1908, the process determines if user input de-selects a grouping (step 1910). If grouping is not de-selected in step 1910, the process determines if user input marks a grouping (step 1912). If no grouping is marked in step 1912, the process determines if user input unmarks a grouping (step 1914).

Next, if grouping is not unmarked in step 1914, the process determines if user input toggles to instrumentation mode (step 1916). If toggling to instrumentation mode is not selected in step 1916, the process determines whether the user input is to save the changes (step 1918). If the user input is not to save the changes, the process determines if the user input displays processes (step 1920). If the user input does not display processes in step 1920, the process determines if the user input closes the graphical user interface (step 1922).

If the process determines that the user input closes the graphical user interface in step 1922, the process terminates. If the process determines that user input does not close the graphical user interface in step 1922, the process returns to step 1906 to wait for additional user input.

With reference again to step 1920, if the process determines that user input is to display processes, the process returns to step 1900 to display processes. With reference again to step 1918, if the user input is to save changes, any changes made to the displayed groupings are saved (step 1934). The process then returns to step 1906 as described above. The execution of step 1934 results in the application or process presenting the graphical user interface, interfacing with the kernel or a kernel extension to make the selected code using the hardware support as well as indicating the appropriate mode for the processor. If in step 1916, the user input toggles to instrumentation mode, the process switches modes (step 1932) and returns to step 1906 to wait for additional user input. The mode switches or toggles between an instrumentation mode and a normal mode in these examples.

If in step 1914, the user input unmarks groupings, the process unmarks all selected groupings (step 1930) and returns to step 1906. Turning back to step 1912, if user input marks a grouping, the process marks all selected groupings (step 1928) and returns to step 1906 to wait for additional user input. If in step 1910, user input de-selects a grouping, the process removes highlighting from selected groupings (step 1926) with the process returning to step 1906 as described above. If step 1908 determines that user input selects a grouping, the process highlights the grouping (step 1924) and returns to step 1906.

Turning now to FIG. 20, a diagram illustrating controls for placing a processor into an instrumentation mode is depicted in accordance with an illustrative embodiment. In this example, code 2000 contains instructions used to set up for an instrumentation call. This code is used to cause the processor to use instrumentation resources in place of the normal resources when instrumentation code is executed. This is a mechanism where the program writer has marked a call as instrumentation via compiler directives and the compiler has generated code that knows how to set up the instrumented call. The call_instr is a new instruction supported by the hardware in these examples.

With reference now to FIG. 21, an example of instructions to change modes is depicted in accordance with an illustrative embodiment. In this example, code 2100 illustrates an instruction to enter an instrumentation mode in line 2102 and an instruction to return to a normal mode in line 2104. The execution of the start instrumentation instruction increments a counter in an instrumentation mode register that is saved/restored in the thread context area. If the counter is non-zero, then all code being executed is treated as instrumentation code. If the counter is zero, then all code is treated as normal code. While the code is in instrumentation mode, either the separate resources or a separate processor is used. All instructions are executed in this mode in these illustrative examples. In one embodiment, the execution of the instruction simply means start using the shadow or duplicate resources. In an alternative embodiment, no dispatching of other threads occurs between the start and stop instrumentation instructions.

Turning now to FIG. 22, a diagram illustrating a use of address ranges is depicted in accordance with an illustrative embodiment. In this example, code 2200 illustrates code used to set address ranges for a range of instrumentation instructions. Lines 2202 and 2204 identify the start address and end address of a range of instructions, respectively. When instructions of the start address are encountered, control is transferred such that the processor enters an instrumentation mode. When the end of the address range is reached, the processor returns to a normal mode of execution. In these examples, system registers and control registers are used. The use of these address ranges do not require a change to the application or instrumentation code stream in the embodiments. The hardware takes care of mode switches when the address ranges are encountered. This type of instruction is used in a set up such as the one found in FIG. 10 as described above.

Turning now to FIG. 23, a diagram illustrating the use of a MSR or control register bit kept by thread is depicted in accordance with an illustrative embodiment. In this example, code 2300 is used to set the processor into an instrumentation mode and a normal mode. If the control bit is set, the processor is in an instrumentation mode. If the bit is not set, the processor is in a normal mode of execution. This figure provides another mechanism for performing the same function shown in FIGS. 20, 21, and 22.

Turning now to FIG. 24, a diagram illustrating code for marking instructions on a per instruction basis is depicted in accordance with an illustrative embodiment. In these examples, code 2400 is marked on an instruction by instruction basis. For example, lines 2402, 2404, 2406, and 2408 are instrumented code. This figure provides a different implementation to perform the same things as depicted in FIGS. 20, 21, 22, and 23. The program writer has identified instructions to be treated as instrumentation instructions and has set the mode using the new hardware support.

Additionally, the illustrative embodiment provides a number of mechanisms for use in determining whether instructions are instrumentation instructions. For example, individual instructions may be tagged using an extra unused bit. As another example, groups or ranges of instructions may be designated. For example, all instructions in a page, address range, object file, within a function or a method may be designated. Regardless of how instructions are marked, these instructions are ignored if the instrumentation mode is not present. If an instrumentation mode is present, the processor may execute instructions itself if the target is the processor. The instructions may be sent to another processor for execution if the target is set to another processor.

The invention can take the form of an entirely hardware embodiment, an entirely software embodiment or an embodiment containing both hardware and software elements. In a preferred embodiment, the invention is implemented in hardware, but controlled by software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing instructions, the computer implemented method comprising:

selecting a first instruction of a set of instructions as a start instrumentation instruction, wherein an instrumentation instruction comprises an instruction that is executed to obtain information about an execution of an application;

selecting a second instruction of the set of instructions as an end instrumentation instruction;

selecting a target processor for executing instructions of the set of instructions in an instrumentation mode to form a selected target processor;

executing the set of instructions using a normal set of processor resources in a current processor, wherein the normal set of processor resources comprises at least one of a pipeline, a cache, a translation look-aside buffer, and a performance counter;

identifying the start instrumentation instruction for execution while executing the set of instructions using the normal set of processor resources in the current processor;

identifying the selected target processor;

responsive to identifying the start instrumentation instruction and the selected target processor:
 executing instructions of the set of instructions subsequent to the start instrumentation instruction in the instrumentation mode as instrumentation instructions using an alternate set of processor resources in the selected target processor; and
 locking the normal set of processor resources in a read only state;

identifying the end instrumentation instruction for execution while executing the subsequent instructions in the instrumentation mode using the alternate set of processor resources in the selected target processor; and responsive to identifying the end instrumentation instruction:
 unlocking the normal set of processor resources from the read only state; and
 executing instructions of the set of instructions following the end instrumentation instruction using the normal set of processor resources in the current processor.

2. The computer implemented method of claim 1, wherein the step of executing the subsequent instructions further comprises:
 copying a state of the normal set of processor resources to the alternate set of processor resources for use in executing the subsequent instructions.

3. The computer implemented method of claim 1, wherein the subsequent instructions comprise at least one of a library, a subroutine, or a function called during execution of the subsequent instructions.

4. The computer implemented method of claim 1, wherein the selected target processor comprises the current processor.

5. The computer implemented method of claim 1, wherein selecting a target processor for executing instructions in an instrumentation mode to form a selected target processor, comprises selecting the target processor through instrumentation code by one of a user, at random, or based on a locality of the target processor.

6. The computer implemented method of claim 1, wherein the steps of selecting a first instruction of a set of instructions as a start instrumentation instruction, and selecting a second instruction of the set of instructions as an end instrumentation instruction are performed using a graphical user interface.

7. The computer implemented method of claim 1, wherein the steps of selecting a first instruction of a set of instructions as a start instrumentation instruction, and selecting a second instruction of the set of instructions as an end instrumentation instruction comprises:
 marking the first instruction of the set of instructions as the start instrumentation instruction, and marking the second instruction of the set of instructions as the end instrumentation instruction.

8. The computer implemented method of claim 1, wherein selecting a first instruction of a set of instructions as a start instrumentation instruction, comprises:
 selecting the first instruction of the set of instructions as the start instrumentation instruction based on a policy.

9. The computer implemented method of claim 8, wherein the policy is based on at least one of a particular user being logged on to a data processing system, a number of times a program has been executed, and a user action.

10. The computer implemented method of claim 1, wherein the alternate set of processor resources comprises a duplicate of at least a portion of the normal set of processor resources.

11. The computer implemented method of claim 10, wherein the duplicate of at least a portion of the normal set of processor resources comprises a duplicate of a state of the at least a portion of the normal set of processor resources.

12. A computer implemented method for processing instructions, the computer implemented method comprising:
 selecting, using a graphical user interface, a first instruction of a set of instructions as a start instrumentation instruction, wherein an instrumentation instruction comprises an instruction that is executed to obtain information about an execution of an application;
 selecting, using the graphical user interface, a second instruction of the set of instructions as an end instrumentation instruction;
 selecting a target processor for executing instructions of the set of instructions in an instrumentation mode to form a selected target processor;
 executing the set of instructions using a normal set of processor resources in a current processor, wherein the normal set of processor resources comprises at least one of a pipeline, a cache, a translation look-aside buffer, and a performance counter;
 identifying the start instrumentation instruction for execution while executing the set of instructions using the normal set of processor resources in the current processor;
 responsive to identifying the start instrumentation instruction:
  identifying the selected target processor;
  executing instructions of the set of instructions subsequent to the start instrumentation instruction in the instrumentation mode as instrumentation instructions using an alternate set of processor resources in the selected target processor, wherein the step of executing instructions of the set of instructions subsequent to the start instrumentation instruction in an instrumentation mode further comprises copying a state of the normal set of processor resources to the alternate set of processor resources for use in executing the subsequent instructions in the instrumentation mode, and wherein the alternate set of resources comprises at least an L1 cache, an L2 cache and a pipeline; and
  locking the normal set of processor resources in a read only state;
 identifying the end instrumentation instruction for execution while executing the subsequent instructions in the instrumentation mode using the alternate set of processor resources in the selected target processor; and
 responsive to identifying the end instrumentation instruction:
  unlocking the normal set of processor resources from the read only state; and
  executing instructions of the set of instructions following the end instrumentation instruction using the normal set of processor resources in the current processor.

13. A computer program product, comprising:
a non-transitory computer readable storage medium storing computer usable program code for processing instructions, the computer program product comprising:
computer usable program code for selecting a first instruction of a set of instructions as a start instrumentation instruction, wherein an instrumentation instruction comprises an instruction that is executed to obtain information about an execution of an application;
computer usable program code for selecting a second instruction of the set of instructions as an end instrumentation instruction;
computer usable program code for selecting a target processor for executing instructions of the set of instructions in an instrumentation mode to form a selected target processor;
computer usable program code for executing the set of instructions using a normal set of processor resources in a current processor, wherein the normal set of processor resources comprises at least one of a pipeline, a cache, a translation look-aside buffer, and a performance counter;
computer usable program code for identifying the start instrumentation instruction for execution while executing the set of instructions using the normal set of processor resources in the current processor;
computer usable program code for identifying the selected target processor;
responsive to identifying the start instrumentation instruction and the selected target processor:
computer usable program code for executing instructions of the set of instructions subsequent to the start instrumentation instruction in the instrumentation mode as instrumentation instructions using an alternate set of processor resources in the selected target processor; and
computer usable program code for locking the normal set of processor resources in a read only state;
computer usable program code for identifying the end instrumentation instruction for execution while executing the subsequent instructions in the instrumentation mode using the alternate set of processor resources in the selected target processor; and
responsive to identifying the end instrumentation instruction:
computer usable program code for unlocking the normal set of processor resources from the read only state; and
computer usable program code for executing instructions of the set of instructions following the end instrumentation instruction using the normal set of processor resources in the current processor.

14. The computer program product of claim 13, wherein the computer usable program code for executing the subsequent instructions further comprises:
computer usable program code for copying a state of the normal set of processor resources to the alternate set of processor resources for use in executing the subsequent instructions.

15. The computer program product of claim 13, wherein the computer usable program code for selecting a first instruction of a set of instructions as a start instrumentation instruction, comprises:
computer usable program code for selecting the first instruction of the set of instructions as the start instrumentation instruction based on a policy.

16. The computer program product of claim 15, wherein the policy is based on at least one of a particular user being logged on to a data processing system, a number of times a program has been executed, and a user action.

17. An apparatus for processing instructions, comprising:
a hardware memory storing computer usable program code; and
a processor executing the computer usable program code to:
select a first instruction of a set of instructions as a start instrumentation instruction, wherein an instrumentation instruction comprises an instruction that is executed to obtain information about an execution of an application;
select a second instruction of the set of instructions as an end instrumentation instruction;
select a target processor for executing instructions of the set of instructions in an instrumentation mode to form a selected target processor;
execute the set of instructions using a normal set of processor resources in a current processor, wherein the normal set of processor resources comprises at least one of a pipeline, a cache, a translation look-aside buffer, and a performance counter;
identify the start instrumentation instruction for execution while executing the set of instructions using the normal set of processor resources in the current processor;
identify the selected target processor;
responsive to identifying the start instrumentation instruction and the selected target processor: execute instructions of the set of instructions subsequent to the start instrumentation instruction in the instrumentation mode as instrumentation instructions using an alternate set of processor resources in the selected target processor, and lock the normal set of processor resources in a read only state;
identify the end instrumentation instruction for execution while executing the subsequent instructions in the instrumentation mode using the alternate set of processor resources in the selected target processor; and
responsive to identifying the end instrumentation instruction: unlock the normal set of processor resources from the read only state, and execute instructions of the set of instructions following the end instrumentation instruction using the normal set of processor resources in the current processor.

18. The apparatus of claim 17, wherein the processor executing the computer usable program code to execute the subsequent instructions further comprises:
the processor executing the computer usable program code to copy a state of the normal set of processor resources to the alternate set of processor resources for use in executing the subsequent instructions.

19. The apparatus of claim 17, wherein the processor executing the computer usable program code to select a first instruction of a set of instructions as a start instrumentation instruction, comprises:
the processor executing the computer usable program code to select the first instruction of the set of instructions as the start instrumentation instruction based on a policy.

20. The apparatus of claim 17, and further comprising a graphical user interface, wherein the processor executing the computer usable program code to select a first instruction of a set of instructions as a start instrumentation instruction, and to select a second instruction of the set of instructions as an end instrumentation instruction are performed using the graphical user interface.

* * * * *